(12) United States Patent
Fujii

(10) Patent No.: US 10,613,430 B2
(45) Date of Patent: *Apr. 7, 2020

(54) INSTANT FILM PACK AND IMAGE RECORDING DEVICE

(71) Applicant: FUJIFILM Corporation, Tokyo (JP)

(72) Inventor: Takeshi Fujii, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,027

(22) Filed: Jul. 27, 2018

(65) Prior Publication Data

US 2018/0373137 A1 Dec. 27, 2018

Related U.S. Application Data

(63) Continuation of application No. PCT/JP2016/085164, filed on Nov. 28, 2016.

(30) Foreign Application Priority Data

Feb. 25, 2016 (JP) .................................. 2016-033969

(51) Int. Cl.
*G03C 3/00* (2006.01)
*G03B 17/53* (2006.01)
(Continued)

(52) U.S. Cl.
CPC .................. *G03C 3/00* (2013.01); *B41J 2/44* (2013.01); *G03B 17/52* (2013.01); *G03B 27/00* (2013.01);
(Continued)

(58) Field of Classification Search
CPC .................................. G03B 17/52; G03C 3/00
See application file for complete search history.

(56) References Cited

U.S. PATENT DOCUMENTS 4,392,731 A * 7/1983 Van Heyningen ..... G03B 17/32
396/30
4,443,530 A * 4/1984 Cronin ..................... G03C 8/34
396/583
(Continued)

FOREIGN PATENT DOCUMENTS

JP H07-159933 A 6/1995
JP H07-209814 A 8/1995
(Continued)

OTHER PUBLICATIONS

International Search Report issued in PCT/JP2016/085164; dated Feb. 28, 2017.
(Continued)

*Primary Examiner* — Minh Q Phan
(74) *Attorney, Agent, or Firm* — Studebaker & Brackett PC

(57) ABSTRACT

In a case that accommodates an instant film, an exposure opening portion, a discharge port, and a claw opening portion are provided. The exposure opening portion is light-shielded by a film cover that is disposed to overlap the instant film. The film cover includes a notched portion connected to the claw opening portion. In a case where the film cover is not removed in use, a claw inserted through the claw opening portion is moved within a range of the notched portion. In a case where the film cover is removed in use, the claw is moved within a range that exceeds the range of the notched portion.

20 Claims, 31 Drawing Sheets

(51) Int. Cl.
*G03B 17/52* (2006.01)
*B41J 2/44* (2006.01)
*H04N 5/225* (2006.01)
*G03B 27/00* (2006.01)
*G03B 27/72* (2006.01)
*G03D 5/06* (2006.01)

(52) U.S. Cl.
CPC ............. *G03B 27/72* (2013.01); *G03D 5/067* (2013.01); *H04N 5/225* (2013.01); *H04N 5/2251* (2013.01)

(56) References Cited

U.S. PATENT DOCUMENTS

| | | | |
|---|---|---|---|
| 4,903,063 A * | 2/1990 | Hara | G03B 17/32 396/33 |
| 6,195,508 B1 | 2/2001 | Katayama et al. | |
| 6,305,856 B1 | 10/2001 | Miyazaki | |
| 7,095,433 B1 * | 8/2006 | Touma | H04N 1/40031 348/207.2 |
| 2003/0165338 A1 * | 9/2003 | Mizuno | G03B 17/26 396/518 |
| 2005/0047769 A1 | 3/2005 | Takatori et al. | |

FOREIGN PATENT DOCUMENTS

| | | |
|---|---|---|
| JP | 2000-089354 A | 3/2000 |
| JP | 2001-030532 A | 2/2001 |
| JP | 2002-318435 A | 10/2002 |
| JP | 2005-077852 A | 3/2005 |

OTHER PUBLICATIONS

Written Opinion issued in PCT/JP2016/085164; dated Feb. 28, 2017.

International Preliminary Report on Patentability issued in PCT/JP2016/085164; dated Aug. 28, 2018.

An Office Action mailed by the Japanese Patent Office dated Oct. 2, 2019, which corresponds to Japanese Patent Application No. 2018-500996 and is related to U.S. Appl. No. 16/047,027.

* cited by examiner

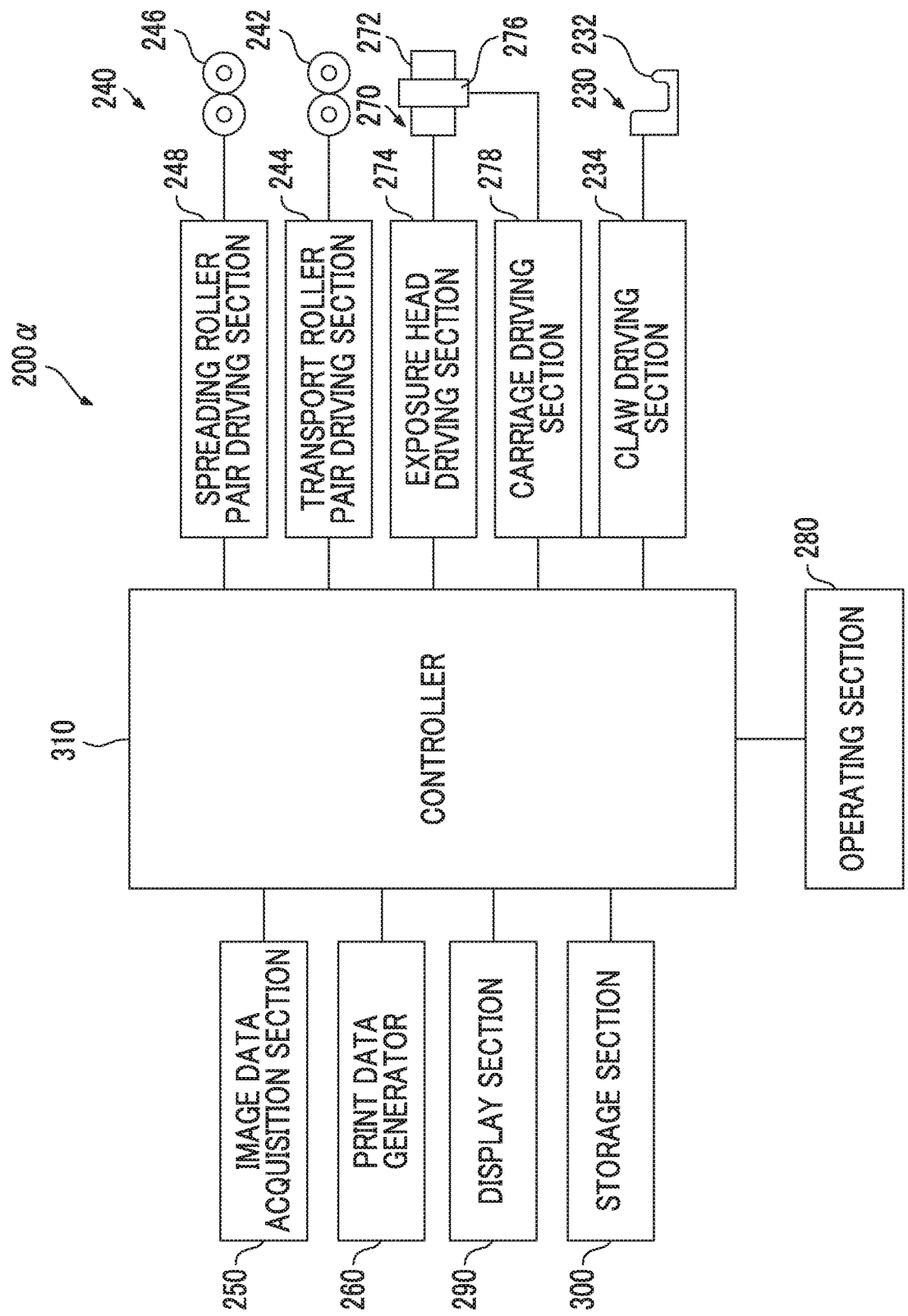

INSTANT FILM PACK AND IMAGE RECORDING DEVICE

CROSS REFERENCE TO RELATED APPLICATIONS

This application is a Continuation of PCT International Application No. PCT/JP2016/085164 filed on Nov. 28, 2016, which claims priority under 35 U.S.C. § 119(a) to Patent Application No. 2016-033969 filed in Japan on Feb. 25, 2016, all of which are hereby expressly incorporated by reference into the present application.

BACKGROUND OF THE INVENTION

1. Field of the Invention

The present invention relates to an instant film pack and an image recording device that uses the instant film pack.

2. Description of the Related Art

An instant film pack includes an instant film and a case that accommodates the instant film. As the instant film pack, an instant film pack that has an exposure opening portion (for example, JP-H07-209814A (JP1995-209814A), or the like), and an instant film pack that does not have an exposure opening portion (for example, JP2005-77852A, or the like) have been proposed. The exposure opening portion refers to an opening portion provided in a case to expose an exposure region of an instant film accommodated in the case.

The instant film pack that is provided with the exposure opening portion is mainly used in an analog-type instant camera. The analog-type instant camera refers to a camera of a type in which an image of a subject is formed on an exposure surface of an instant film using a lens to record the image of the subject on the instant film. In the analog-type instant camera, the instant film is used in a state of being accommodated in a case. For this reason, the instant film pack used in the analog-type instant camera needs to have an exposure opening portion.

On the other hand, in the instant film pack that is not provided with the exposure opening portion is mainly used in a printer. In the printer, the instant film is extracted for use from a case. For this reason, the instant film pack used in the printer does not need to have the exposure opening portion.

SUMMARY OF THE INVENTION

As described above, the instant film pack used in the analog-type instant camera needs to have the exposure opening portion. Thus, the instant film pack that is not provided with the exposure opening portion cannot be used in the analog-type instant camera.

On the other hand, the presence or absence of the exposure opening portion does not matter in the printer. Accordingly, even the instant film pack that is provided with the exposure opening portion is usable in the printer as long as it can be mounted in the printer.

However, in a case where the instant film pack that is provided with the exposure opening portion is used in a printer, the following problems occur.

In order to prevent exposure of the instant film, a film cover is provided in the instant film pack that is provided with the exposure opening portion. The film cover has a card shape, and is disposed to overlap the instant film. The film cover is removed after the instant film pack is loaded in a device. For the removal, a discharge mechanism and a transport mechanism of the instant film provided in the device are used.

However, since the transport mechanism of the instant film provided in the printer is designed on the premise of transport of the instant film, in a case where a film cover having a different stiffness, for example, is transported, it is not possible to appropriately transport the instant film. That is, since the film cover has a stiffness higher than that of the instant film, in a case where the film cover is transported using a transportation mechanism for the instant film, a slip or the like occurs, which leads to a cause of a jam, or the like.

Further, since the printer records an image while transporting the instant film, a uniform accuracy is necessary for the transportation. It is difficult to transport both of the instant film and the film cover while securing the uniform accuracy, and thus, there is a disadvantage that its structure becomes complicated and large.

In consideration of the above-mentioned problems, an object of the invention is to provide an instant film pack capable of employing both of a form in which a film cover is removed in use and a form in which a film cover is not removed in use, and an image recording device that uses the instant film.

(1) According to an aspect of the invention, there is provided an instant film pack comprising: an instant film; a case that accommodates the instant film, and includes an exposure opening portion for exposing an exposure region of the instant film, a discharge port for discharging the instant film, and a claw opening portion for inserting a claw; and a film cover that is mounted in the case, shields light from the exposure opening portion, and includes a notched portion continuous to the claw opening portion.

According to this aspect of the invention, the notched portion is provided at the film cover. The notched portion has a configuration in which the notched portion is connected to the claw opening portion. The configuration in which the notched portion is connected to the claw opening portion refers to a configuration in which the notched portion and the claw opening portion are connected to each other in a state where the film cover is mounted. As a result of the configuration in which the notched portion continuous to the claw opening portion is provided in the film cover, it is possible to provide an instant film pack capable of employing both of a form in which the film cover is removed in use and a form in which the film cover is not removed in use. For example, in a case where the film cover is not removed in use, the claw inserted through the claw opening portion is moved within a range of the notched portion. Thus, it is possible to discharge the instant film in a state where the film cover is mounted. That is, it is possible to use the film cover without being removed. In a case where the film cover is removed in use, the claw is moved within a range that exceeds the range of the notched portion. Thus, feeding is given to the film cover from the claw, and the film cover is removed.

(2) In the instant film pack according to (1), the notched portion has a width narrower than that of the claw opening portion.

According to this aspect of the invention, the width of the notched portion is set to be narrower than the width of the claw opening portion. In a case where the film cover is not removed in use, a claw having a width capable of being inserted into the notched portion is used. In this case, the claw is moved within a range of the notched portion. Thus, it is possible to discharge the instant film in a state where the film cover is mounted. On the other hand, in a case where the film cover is removed in use, a claw having a thickness greater than the width of the notched portion is used. Thus, since the claw may not be inserted into the notched portion, it is possible to discharge the film cover using the claw.

(3) The instant film pack according to (1) or (2) further comprises: a light shielding member that shields light from the claw opening portion and the notched portion.

According to this aspect of the invention, the light shielding member for shielding the claw opening portion and the notched portion is provided. Thus, it is possible to prevent the instant film from being exposed through the claw opening portion and the notched portion.

(4) In the instant film pack according to (3), the light shielding member is configured to be capable of being cut, and is cut by the claw as the claw is inserted into the claw opening portion and the notched portion.

According to this aspect of the invention, the light shielding member is configured to be able to be cut. In a case where the claw is inserted into the claw opening portion and the notched portion, the light shielding member is cut by the claw. The configuration in which the light shielding member is able to be cut refers to a configuration in which the light shielding member is able to be cut by inserting the claw into the claw opening portion and the notched portion. As such a light shielding member, a metallic foil such as an aluminum foil may be used.

(5) In the instant film pack according to (3), the light shielding member is configured to be deformable, and is deformed by being pressed by the claw as the claw is inserted into the claw opening portion and the notched portion.

According to this aspect of the invention, the light shielding member is configured to be deformable. As the claw is inserted into the claw opening portion and the notched portion, the light shielding member is pressed by the claw to be deformed. The configuration in which the light shielding member is deformable refers to a configuration in which the light shielding member is deformable by an operation of inserting the claw into the claw opening portion and the notched portion. As the light shielding member having such a configuration, a flexible resin film may be used as an example.

(6) In the instant film pack according to (3), the light shielding member is configured to be movable, and is moved by being pressed by the claw as the claw is inserted into the claw opening portion and the notched portion.

According to this aspect of the invention, the light shielding member is provided to be movable. As the claw is inserted into the claw opening portion and the notched portion, the light shielding member is pressed by the claw to be moved.

(7) In the instant film pack according to any one of (1) to (6), the film cover is disposed in the case, and is discharged through the discharge port.

According to this aspect of the invention, the film cover is disposed in the case. In discharge, the film cover is discharged through the discharge port, in a similar way to the instant film.

(8) In the instant film pack according to (7), the film cover is disposed to overlap the instant film.

According to this aspect of the invention, the film cover is disposed to overlap the instant film in the case.

(9) According to another aspect of the invention, there is provided an image recording device comprising: a loading chamber in which the instant film pack according to any one of (1) to (8) is loaded; a discharge section that discharges the instant film from the instant film pack loaded in the loading chamber using the claw, the discharge section discharging the instant film by inserting the claw into the case through the claw opening portion and moving the claw within a range of the notched portion; a transport section that transports the instant film discharged by the discharge section; an image data acquisition section that acquires image data; and an exposure head that records an image represented by the image data on the instant film transported by the transport section.

According to this aspect of the invention, the image recording device is configured as a printer. The image recording device is provided with the loading chamber in which the instant film pack is loaded, the discharge section that discharges the instant film from the instant film pack loaded in the loading chamber, the transport section that transports the instant film discharged by the discharge section, and the exposure head that records an image on the instant film transported by the transport section. The image recording device discharges the instant film from the instant film pack loaded in the loading chamber using the discharge section, and records the image on the instant film using the exposure head in a process in which the instant film is transported by the transport section. The image recorded on the instant film is acquired by the image data acquisition section. The discharge section discharges the instant film from the instant film pack using the claw. Here, the discharge section moves the claw within the range of the notched portion to discharge the instant film. Thus, it is possible to discharge the instant film in a state where the film cover is mounted. Since the film cover can be used in a state where the film cover is not removed, it is not necessary to transport both of the film cover and the instant film in the transport section, to thereby make it possible to simplify the configuration.

(10) The image recording device according to (9) further comprises: a digital camera section that captures an image using an image sensor, in which the image data acquisition section acquires image data generated by the digital camera section.

According to this aspect of the invention, the digital camera section is further provided. By providing the digital camera section, it is possible to record an image captured by the digital camera section on the instant film. The digital camera section may be used as a so-called digital camera with a printer.

(11) According to still another aspect of the invention, there is provided an image recording device comprising: a loading chamber in which the instant film pack according to any one of (1) to (8) is loaded; a discharge section that discharges the instant film and the film cover from the instant film pack loaded in the loading chamber using the claw, and in a case where the film cover is discharged, the discharge section discharges the film cover by inserting the claw into the case through the claw opening portion and moving the claw within a range that exceeds a range of the notched portion; a lens that forms a subject image on the instant film of the instant film pack loaded in the loading chamber; and a transport section that transports the instant film and the film cover discharged by the discharge section.

According to this aspect of the invention, the image recording device is configured as an analog-type instant camera. The image recording device is provided with the loading chamber in which the instant film pack is loaded, and the lens that forms a subject image on the instant film of the instant film pack loaded in the loading chamber using the discharge section and the transport section. In order to form the subject image on the instant film, it is necessary to remove the film cover. The image recording device discharges the film cover to the outside of the device. The discharge section discharges the film cover by inserting the claw into the case through the claw opening portion and moving the claw within a range that exceeds a range of the notched portion. The transport section transports the film cover discharged by the discharge section to be discharged to the outside of the device. Here, the transport section is commonly used for the instant film and the film cover, but since imaging of the instant film is finished, high accuracy is not necessary for the transport. Accordingly, even in a case where the transport section is commonly used for the instant film and the film cover, the transport section may have a simple configuration. The discharge section is also commonly used for the instant film and the film cover, but strokes of the claw may vary between a case where the film cover is discharged and a case where the instant film is discharged.

(12) According to still another aspect of the invention, there is provided an image recording device comprising: a loading chamber in which the instant film pack according to (2) is loaded; a discharge section that discharges the instant film and the film cover from the instant film pack loaded in the loading chamber using the claw having a thickness greater than the width of the notched portion; a lens that forms a subject image on the instant film of the instant film pack loaded in the loading chamber; and a transport section that transports the instant film and the film cover discharged by the discharge section.

According to this aspect of the invention, the image recording device is configured as an analog-type instant camera. The image recording device is provided with the loading chamber in which the instant film pack is loaded, and the lens that forms a subject image on the instant film of the instant film pack loaded in the loading chamber. In order to form the subject image on the instant film, it is necessary to remove the film cover. The image recording device discharges the film cover to the outside of the device using the discharge section and the transport section. The discharge section includes the claw having the thickness greater than the width of the notched portion, and inserts the claw in the case through the claw opening portion to discharge the film cover. Since the claw has the thickness greater than the width of the notched portion, the claw cannot enter the notched portion. Accordingly, even in a case where the claw is moved in the same stroke as the stroke in a case where the instant film is discharged, it is possible to discharge the film cover.

According to the invention, it is possible to provide an instant film pack capable of employing both of a configuration in which a film cover is removed in use and a configuration in which the film cover is not removed in use.

BRIEF DESCRIPTION OF THE DRAWINGS

FIG. 33 is a block diagram showing a control system of a printer.

DESCRIPTION OF THE PREFERRED EMBODIMENTS

Hereinafter, preferred embodiments of the invention will be described in detail with reference to the accompanying drawings.

[Instant Film Pack]

First Embodiment

<Structure of Instant Film Pack>

Figure 1:
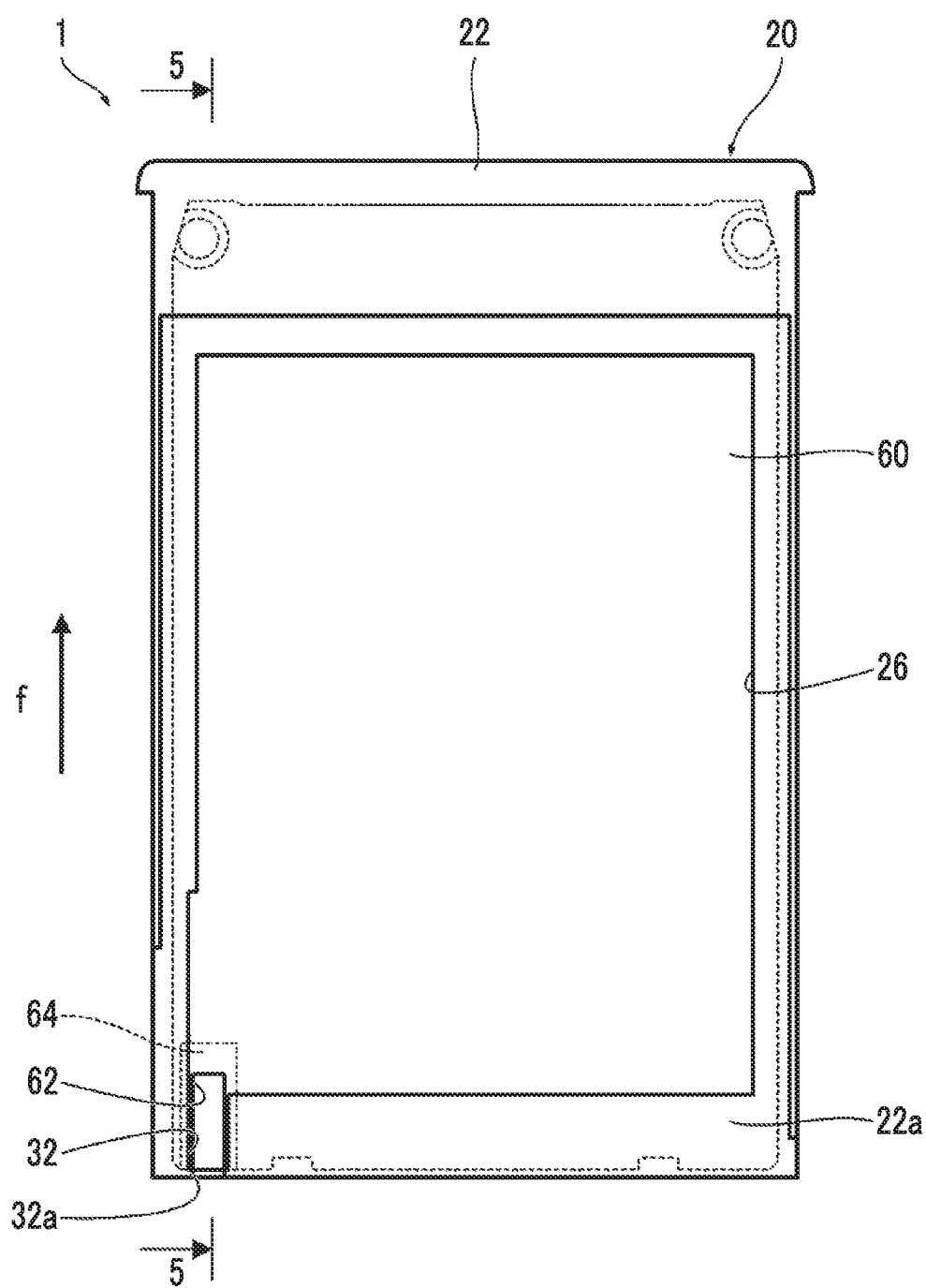
FIG. 1 is a front view of an instant film pack.
Figure 2:
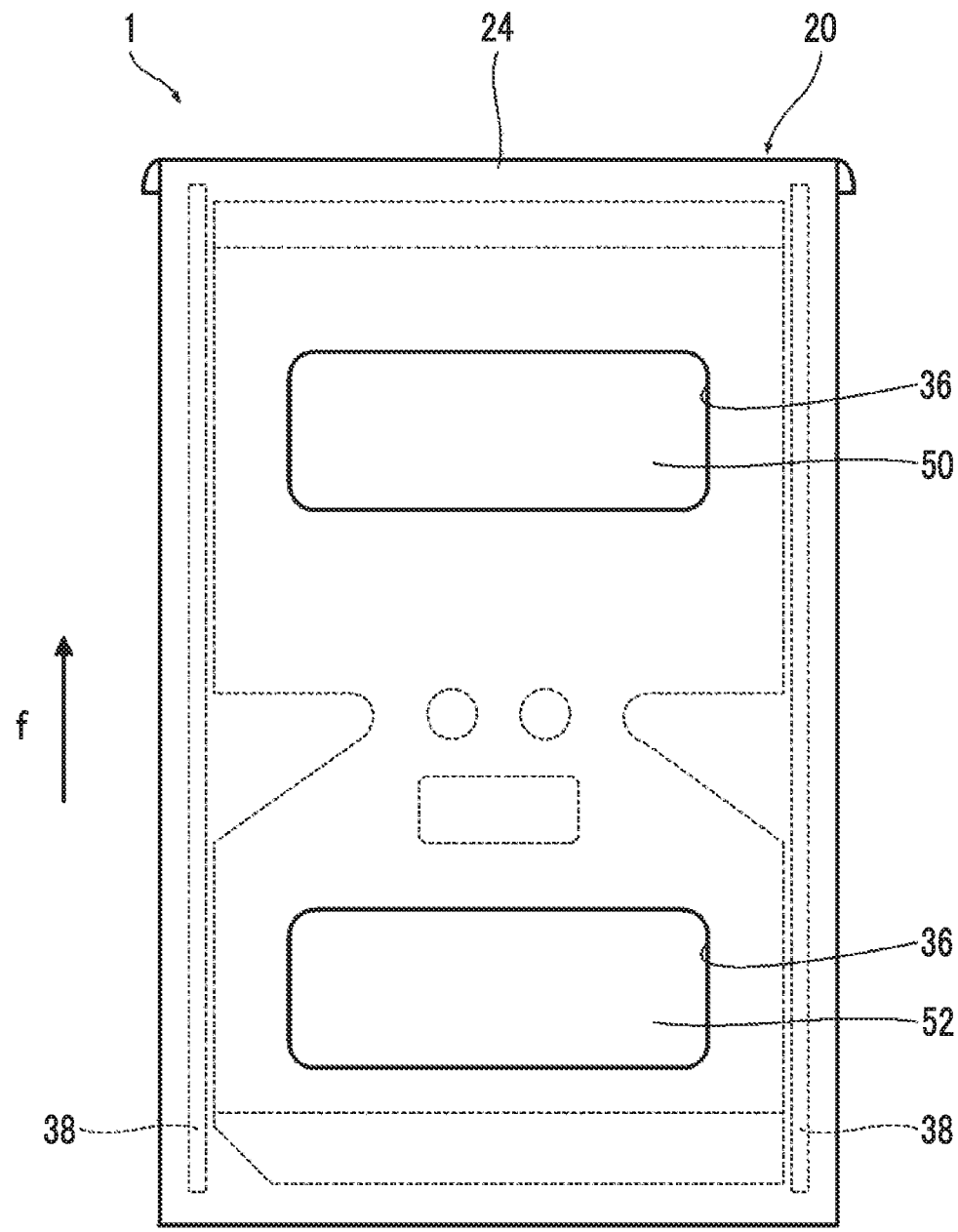
FIG. 2 is a rear view of the instant film pack.
Figure 3:
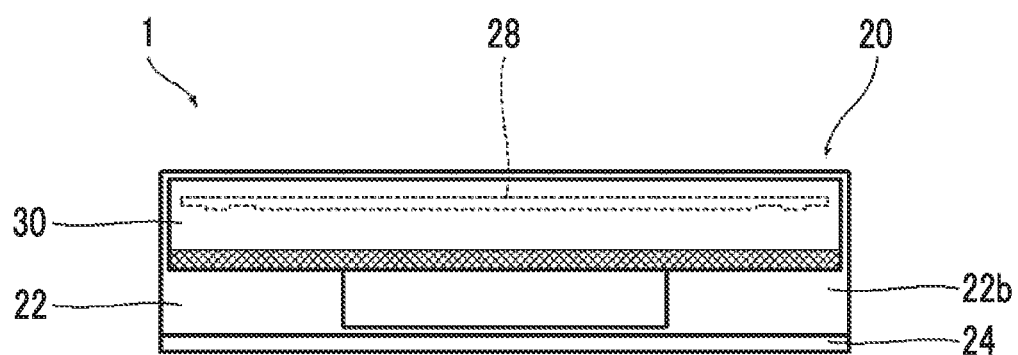
FIG. 3 is a plan view of the instant film pack.
Figure 4:
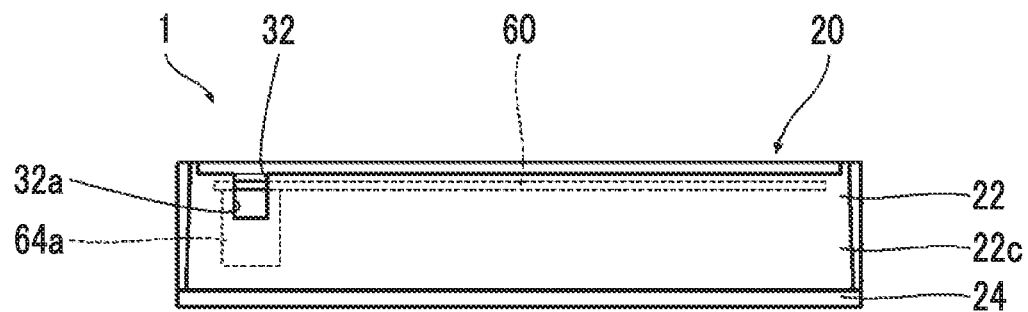
FIG. 4 is a bottom view of the instant film pack.
Figure 5:
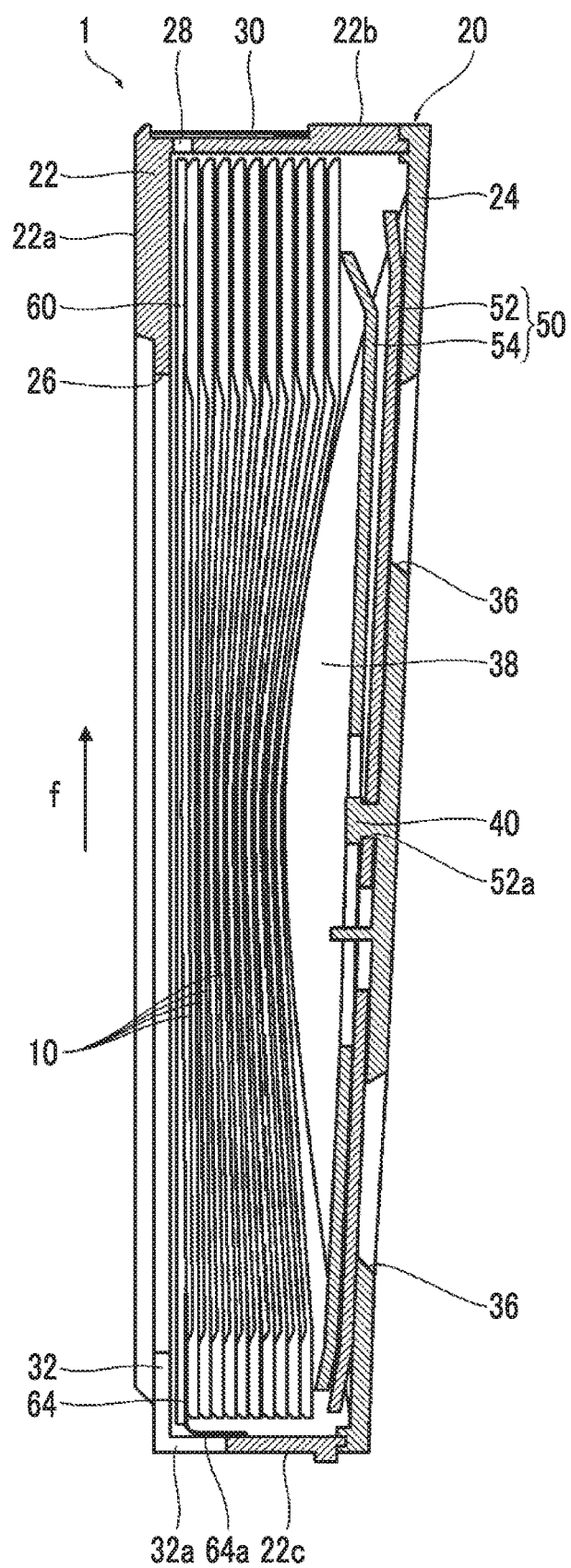
FIG. 5 is a sectional view taken along line 5-5 in FIG. 1.
Figure 6:
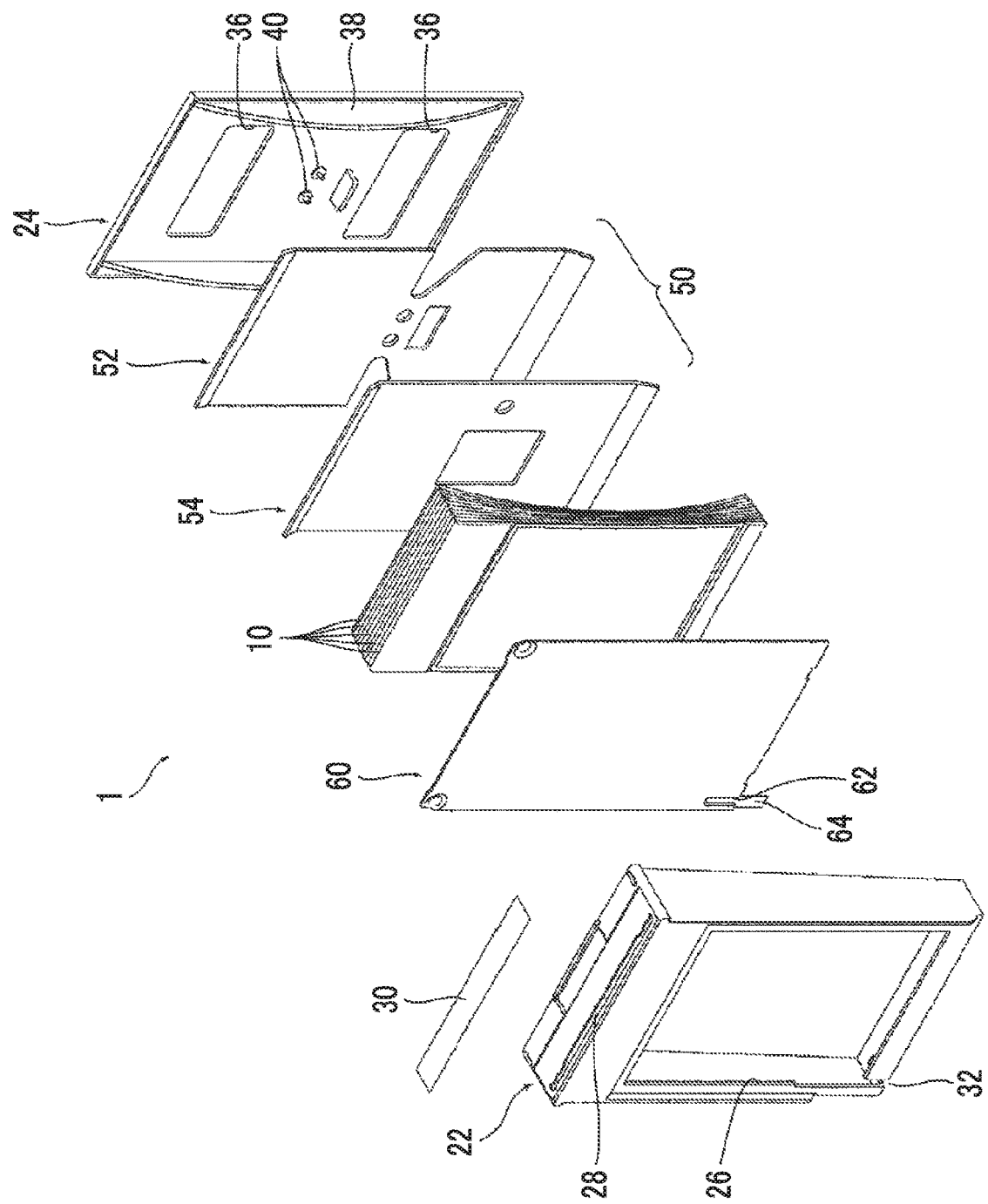
FIG. 6 is an exploded perspective view of the instant film pack.

FIG. 1 is a front view of an instant film pack. FIG. 2 is a rear view of the instant film pack. FIG. 3 is a plan view of the instant film pack. FIG. 4 is a bottom view of the instant film pack. FIG. 5 is a sectional view taken along line 5-5 in FIG. 1. FIG. 6 is an exploded perspective view of the instant film pack.

An instant film pack 1 includes an instant film 10, a case 20 that accommodates the instant film 10, a light shielding sheet 50, and a film cover 60.

<Instant Film>

The instant film 10 is a known self development type instant film, and has a rectangular card shape. The instant film 10 has one side surface that is an exposure surface 10a and the other side surface that is an observation surface 10b.

Figure 7:
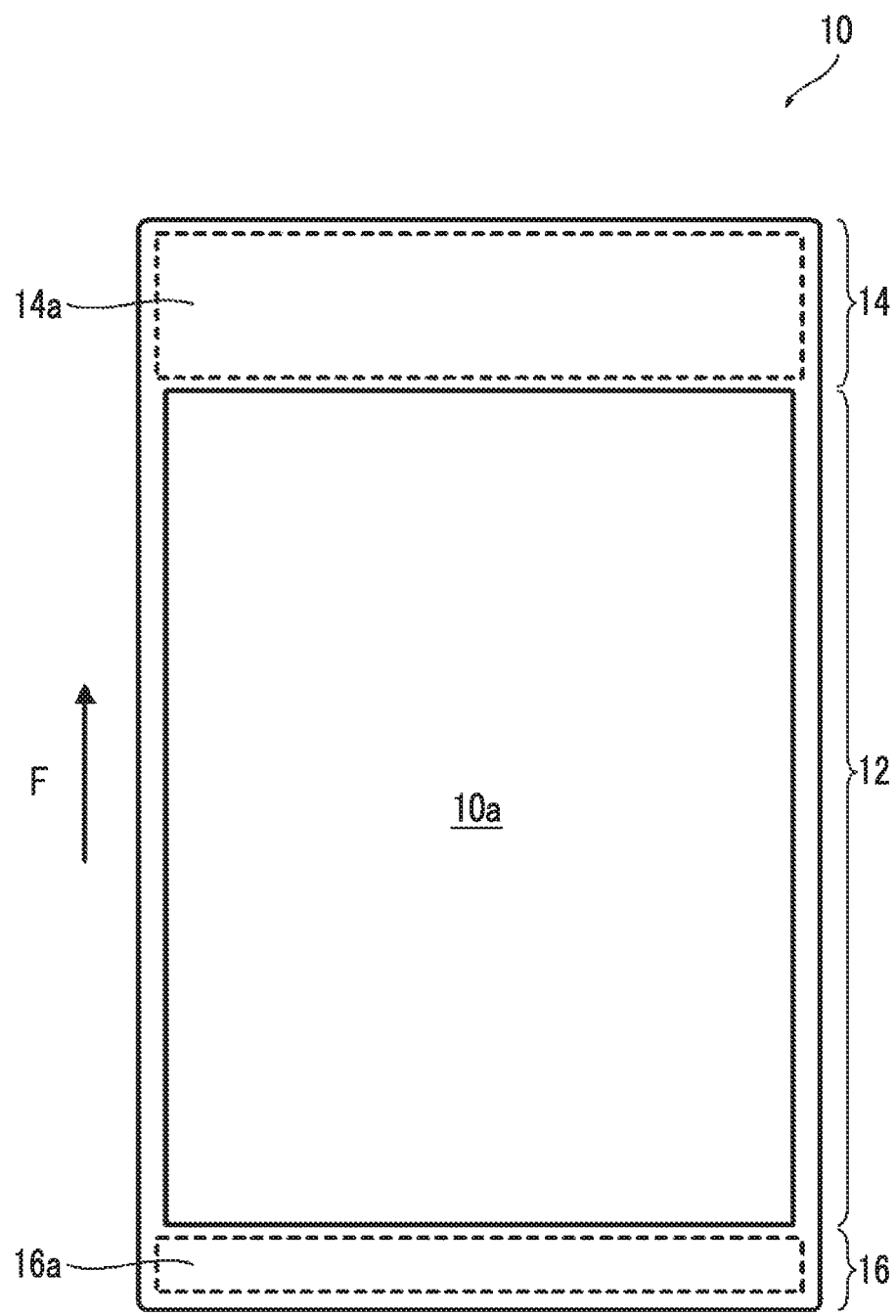
FIG. 7 is a plan view of an instant film seen from an exposure surface side.

FIG. 7 is a plan view of the instant film seen from the exposure surface side. In FIG. 7, a direction indicated using an arrow F is a feeding direction of the instant film 10. The feeding direction F is the same as a usage direction of the instant film 10. In a case where the instant film 10 is accommodated in the case 20, the feeding direction of the instant film 10 becomes a discharge direction of the instant film 10.

On the exposure surface 10a, an exposure portion 12, a pod portion 14, and a trap portion 16 are provided. The exposure portion 12 is an exposure region, which is a rectangular region, and is disposed between the pod portion 14 and the trap portion 16. The pod portion 14 is disposed on a front end side of the instant film 10 in the feeding direction F. In the pod portion 14, a development processing liquid pod 14a that contains a development processing liquid is provided. The trap portion 16 is disposed on a back end side of the instant film 10 in the feeding direction F. An absorption material 16a is provided in the trap portion 16.

Figure 8:
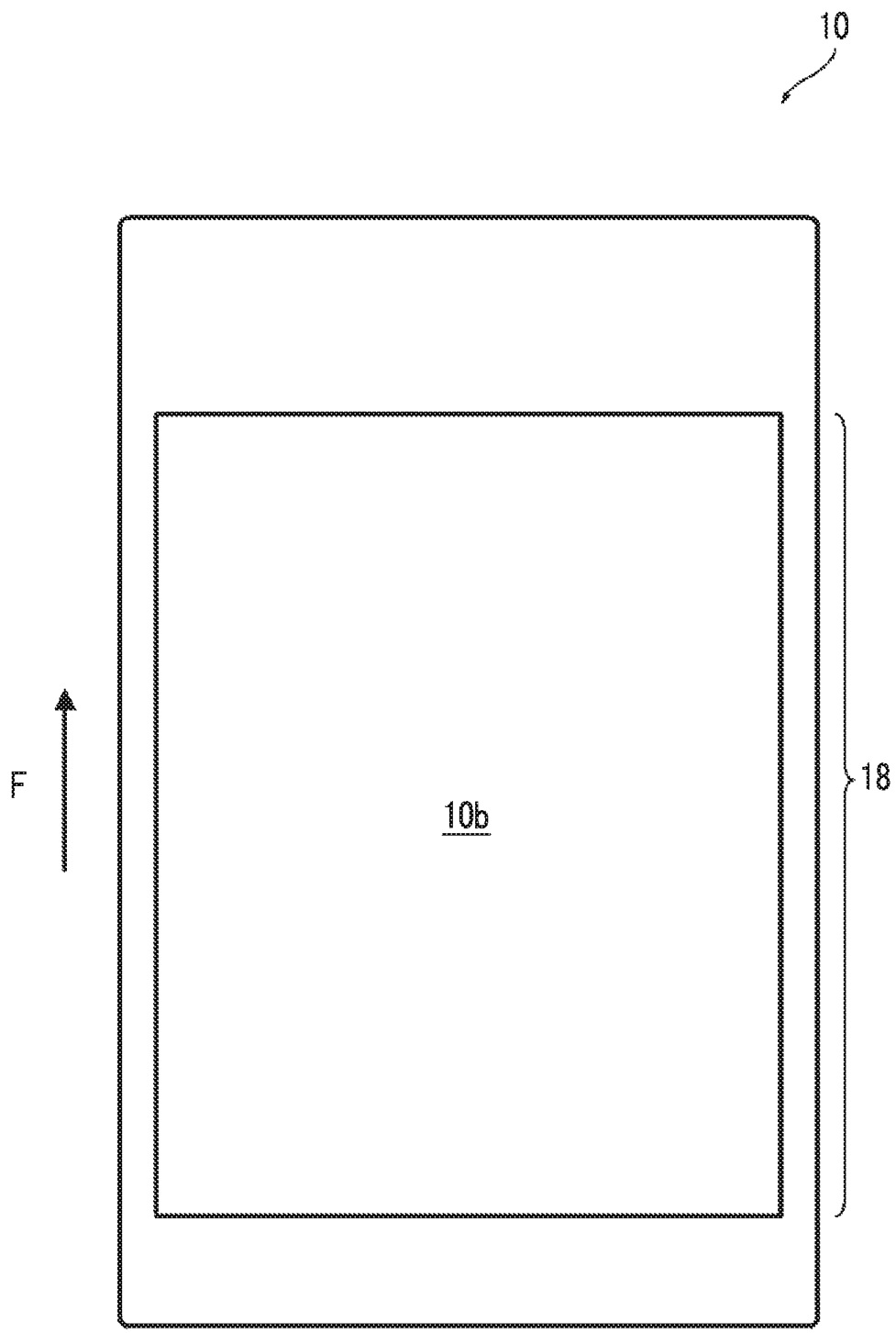
FIG. 8 is a plan view of the instant film seen from an observation surface side.

FIG. 8 is a plan view of the instant film seen from an observation surface side. In FIG. 8, the direction indicated using the arrow F is the feeding direction of the instant film 10.

On the observation surface 10b, an observation portion 18 that is an observation region of a captured image is provided. The observation portion 18 is disposed to correspond to the exposure portion 12 on the exposure surface side.

The instant film 10 is developed by spreading the development processing liquid of the pod portion 14 to the exposure portion 12 after exposure. As the instant film 10 passes through a space between a pair of spreading rollers, the development processing liquid of the pod portion 14 is squeezed out to be spread to the exposure portion 12. Here, the trap portion 16 takes an excessive amount of development processing liquid to process development.

<Case>

The case 20 has a flat rectangular box shape, and accommodates a plurality of instant films 10 in a state of being laminated. As shown in FIG. 6, the case 20 includes a case body 22 and a case cover 24 that blocks a rear surface of the case body 22.

[Case Body]

Figure 9:
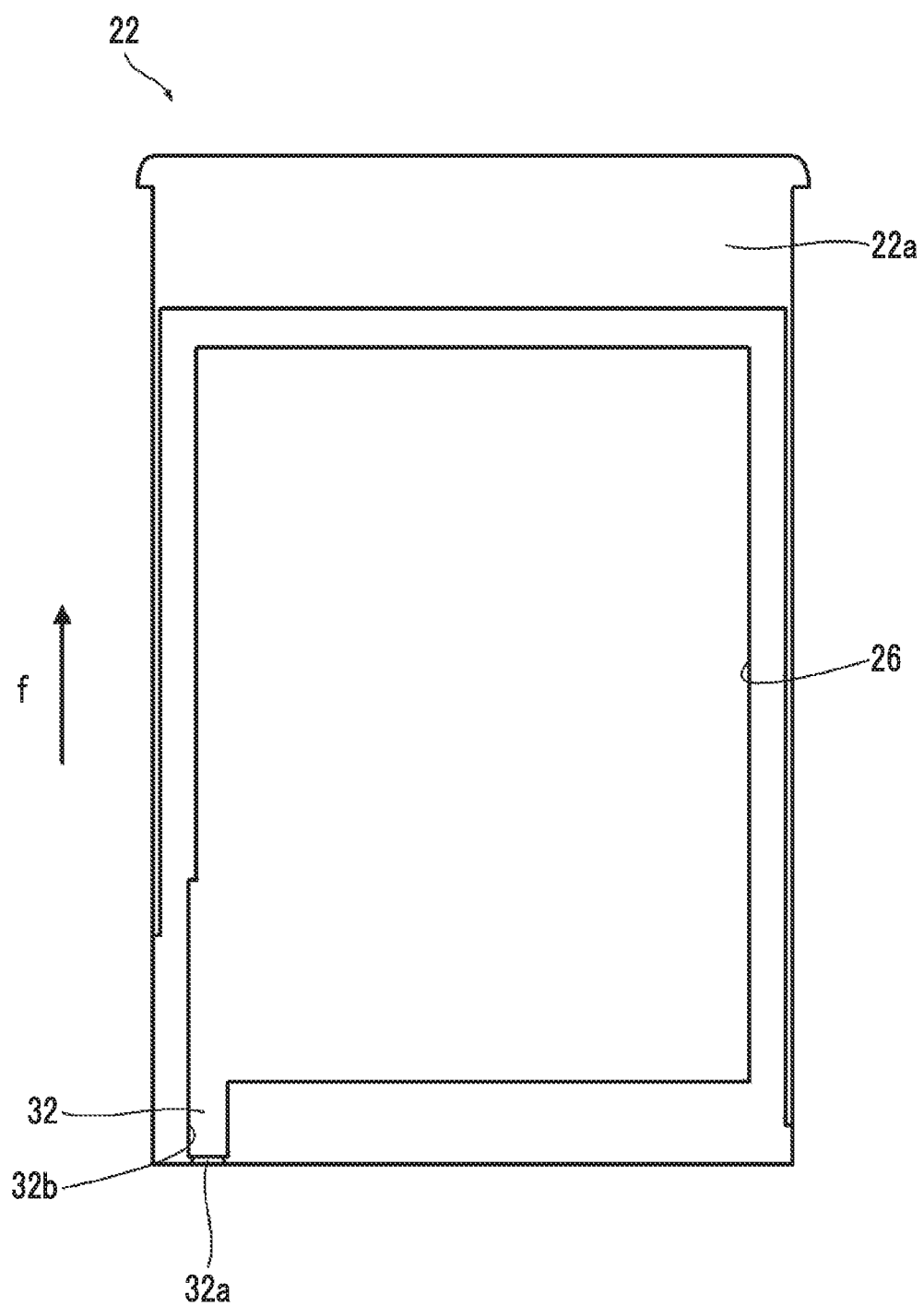
FIG. 9 is a front view of a case body.
Figure 10:
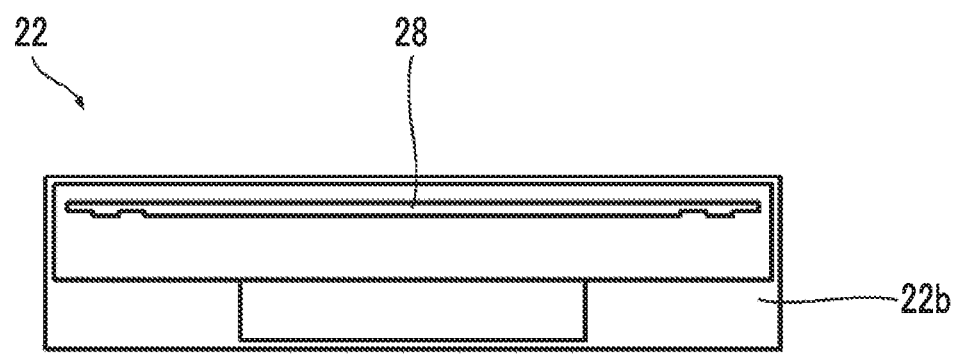
FIG. 10 is a plan view of the case body.
Figure 11:
FIG. 11 is a bottom view of the case body.

FIG. 9 is a front view of a case body. FIG. 10 is a plan view of the case body. FIG. 11 is a bottom view of the case body. In FIG. 9, a direction indicated using an arrow f is a discharge direction of the instant film 10.

The case body 22 has a flat rectangular box shape of which a rear surface portion is opened. In the case body 22, an exposure opening portion 26 for exposing the exposure region of the instant film 10, a discharge port 28 for discharging the instant film 10, a case flap member 30 for shielding the discharge port 28, and a claw opening portion 32 for inserting a claw are provided.

As shown in FIG. 9, the exposure opening portion 26 is provided in a front surface portion 22a of the case body 22. The exposure opening portion 26 has a shape corresponding to the shape of the exposure portion 12 of the instant film 10. The exposure opening portion 26 is disposed at a position where the exposure portion 12 of the instant film 10 accommodated in the case 20 is exposed.

The discharge port 28 is provided on an upper surface portion 22b of the case body 22, as shown in FIG. 10. The discharge port 28 has a slit shape having a size such that the instant film 10 can pass through. The discharge port 28 is disposed at a position where the instant film 10 disposed at the topmost position in the laminating direction is dischargeable.

As shown in FIGS. 3 and 6, the case flap member 30 is formed of a rectangular film piece. In FIG. 3, a region indicated by an oblique grid is a bonding region of the case flap member 30. The case flap member 30 is bonded to the case body 22 along a long side on one side to shield the discharge port 28 to be able to be opened or closed.

As shown in FIGS. 9 and 11, the claw opening portion 32 is provided in the front surface portion 22a and a bottom portion 22c of the case body 22. The claw opening portion 32 has a slit shape, and is linearly disposed in the front surface portion 22a using the bottom portion 22c as a base point. As shown in FIG. 11, in the bottom portion 22c of the case body 22, a notch-shaped inlet 32a that forms a part of the claw opening portion 32 is provided. In the front surface portion 22a of the case body 22, a slit-shaped passage portion 32b that forms the claw opening portion 32 is provided. The passage portion 32b is linearly disposed along the discharge direction f of the instant film 10. An end point of the passage portion 32b becomes the exposure opening portion 26. That is, the claw opening portion 32 is disposed in a form in which the bottom portion 22c of the case body 22 and the exposure opening portion 26 are linearly connected to each other. The width of the claw opening portion 32 is such a width that the claw can be inserted therein.

[Case Cover]

Figure 12:
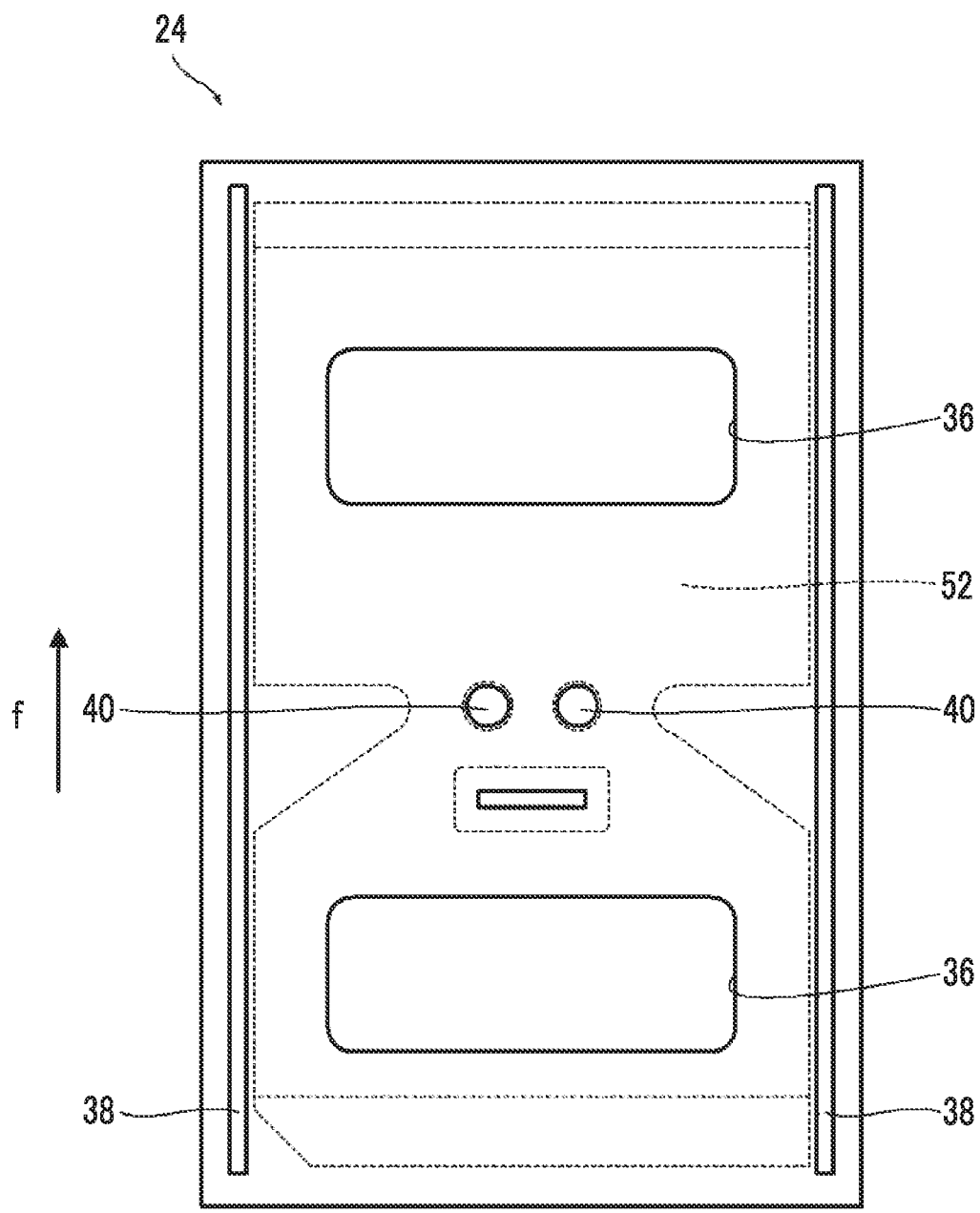
FIG. 12 is a front view of a case cover.

FIG. 12 is a front view of the case cover. In FIG. 12, the direction indicated using the arrow f is the discharge direction of the instant film 10.

The case cover 24 has a rectangular plate shape. The case cover 24 is mounted in a rear surface portion of the case body 22 to block the opened rear surface of the case body 22. In the case cover 24, a pair of uplifting member inserting portions 36, a pair of film support portions 38, and a pair of light shielding sheet mounting portions 40 are provided.

The uplifting member inserting portions 36 are opening portions for inserting uplifting members. The uplifting members are members provided in a device that uses the instant film pack 1. In the device that uses the instant film pack 1, a pair of film lifting members is provided in a loading chamber of the instant film pack 1 (see FIG. 17). In a case where the instant film pack 1 is loaded in the loading chamber, the uplifting members are inserted in the uplifting member inserting portions 36.

The film support portions 38 are support portions that support the instant film pack 1 accommodated in the case 20. Each film support portion 38 is formed of an arc shaped thin plate (see FIG. 6), and is disposed inside the case cover 24 along a long side of the case cover 24 on both sides. The instant film 10 accommodated in the case 20 is supported by the film support portions 38 in a convex shape.

The light shielding sheet mounting portions 40 are mounting portions of the light shielding sheet 50. The light shielding sheet mounting portions 40 are formed of cylindrical pins and are disposed in parallel at a central portion of the case cover 24.

<Light Shielding Sheet>

The light shielding sheet 50 supports the instant film 10 in the case and shields light. As shown in FIG. 6, the light shielding sheet 50 is configured by combining a first light shielding sheet 52 having a function as a plate spring and a second light shielding sheet 54 having a function as a support plate.

Figure 13:
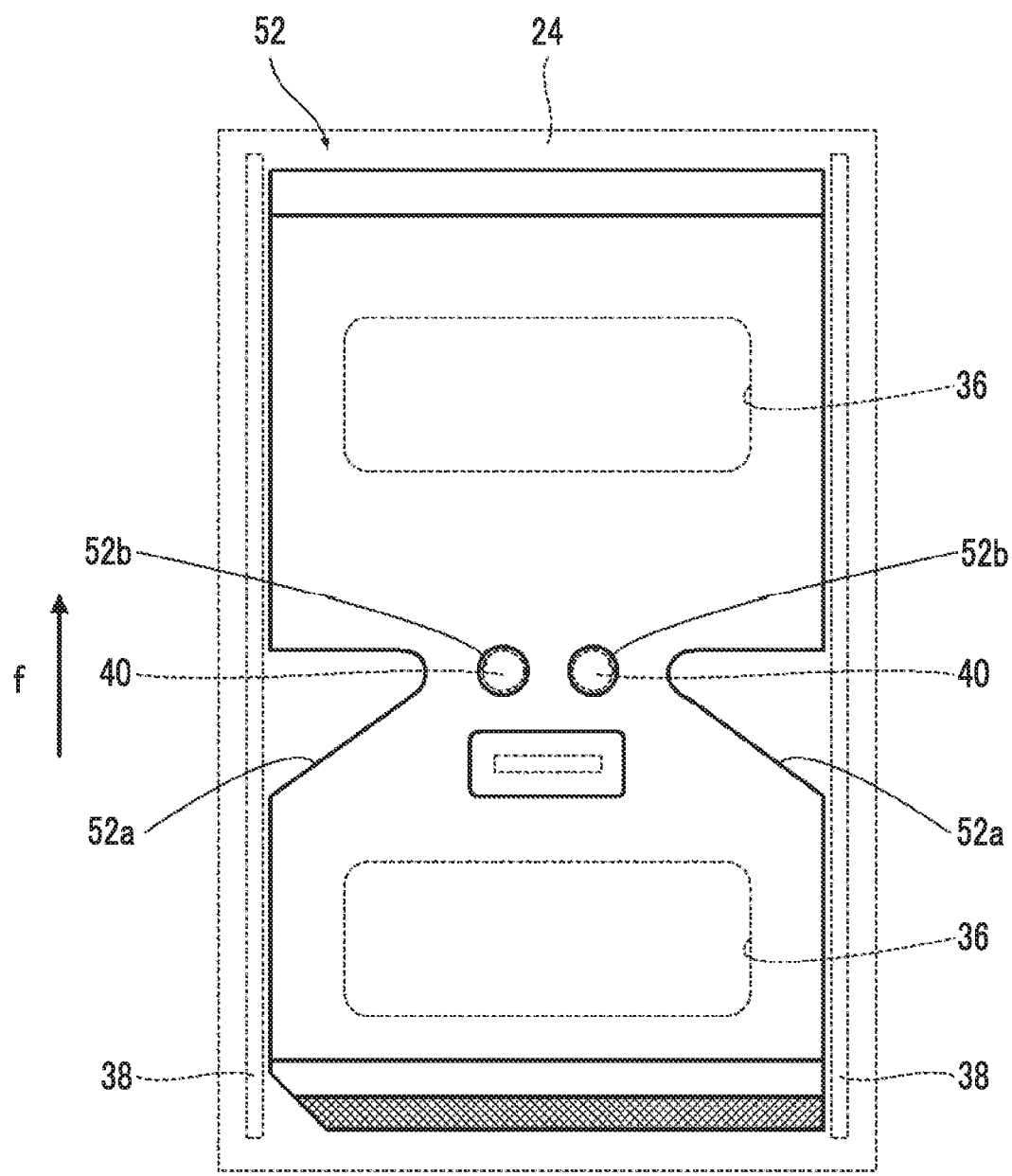
FIG. 13 is a front view of a first light shielding sheet.

FIG. 13 is a front view of the first light shielding sheet. In FIG. 13, the direction indicated using the arrow f is the discharge direction of the instant film 10.

The first light shielding sheet 52 has a card shape provided with cut portions 52a on both sides. Since the first light shielding sheet 52 functions as the plate spring, the first light shielding sheet 52 is configured to be elastically deformable. The cut portions 52a on the opposite sides are provided so that the first light shielding sheet 52 is easily bent along a length direction. The first light shielding sheet 52 is provided with a pair of fixing portions 52b in a central portion thereof. Each fixing portion 52b is configured of a circular hole.

Figure 14:
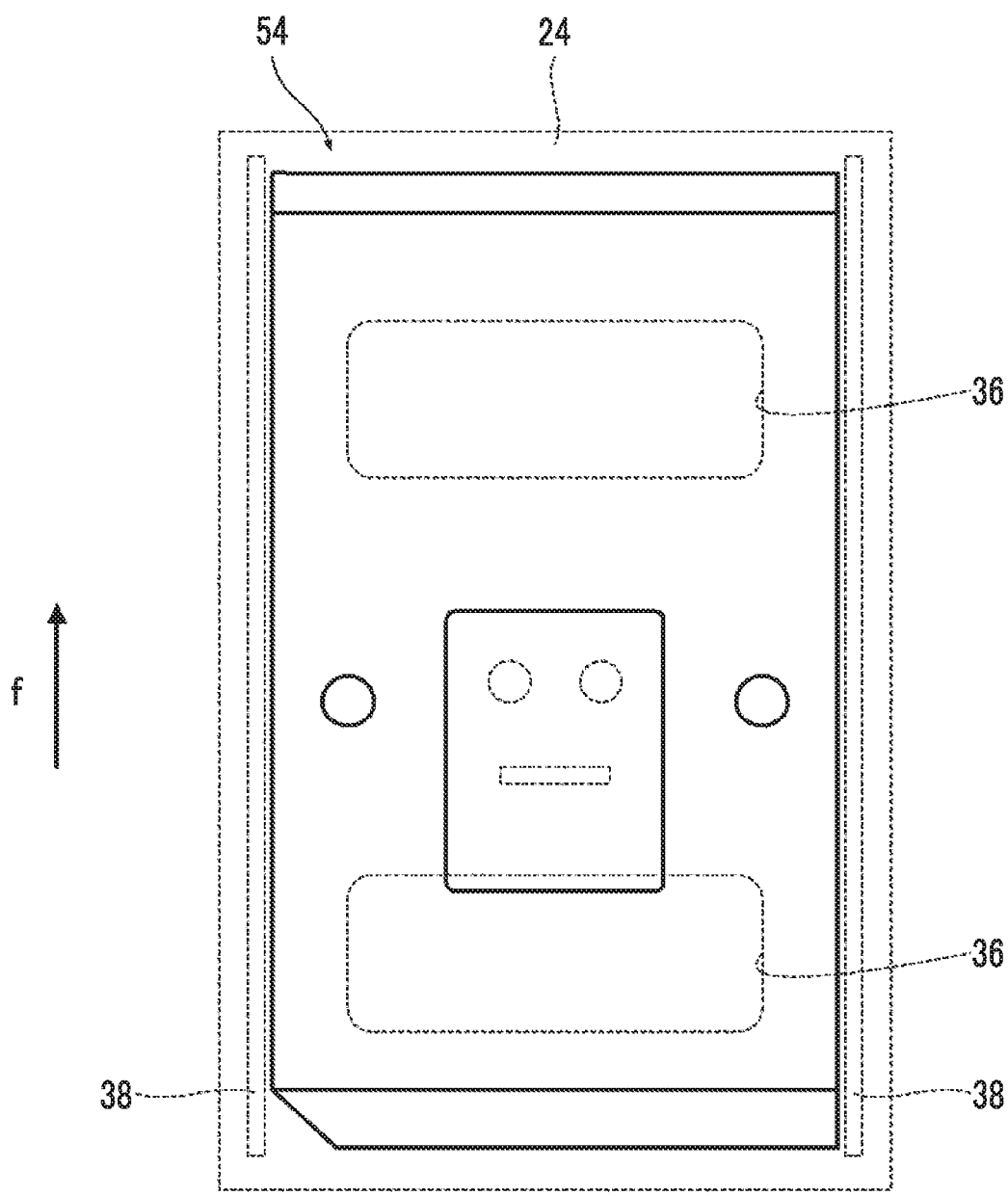
FIG. 14 is a front view of a second light shielding sheet.

FIG. 14 is a front view of the second light shielding sheet. In FIG. 14, the direction indicated using the arrow f is the discharge direction of the instant film 10.

The second light shielding sheet 54 has a rectangular card shape. Since the second light shielding sheet 54 functions as the support plate, the second light shielding sheet 54 has stiffness with respect to the first light shielding sheet 52. The instant films 10 are laminated and supported on the second light shielding sheet 54.

The first light shielding sheet 52 and the second light shielding sheet 54 are bonded to each other at one end in the length direction for integration. In FIG. 13, a region indicated by an oblique grid is a bonding region. The first light shielding sheet 52 and the second light shielding sheet 54 are bonded to each other along one end side in the length direction for integration.

The light shielding sheet 50 obtained by integrating the first light shielding sheet 52 and the second light shielding sheet 54 is mounted on the case cover 24 by inserting the fixing portions 52b of the first light shielding sheet 52 into the light shielding sheet mounting portions 40 of the case cover 24 and then bonding the inserted portions. The light shielding sheet 50 mounted on the case cover 24 is disposed between the pair of film support portions 38.

Figure 15:
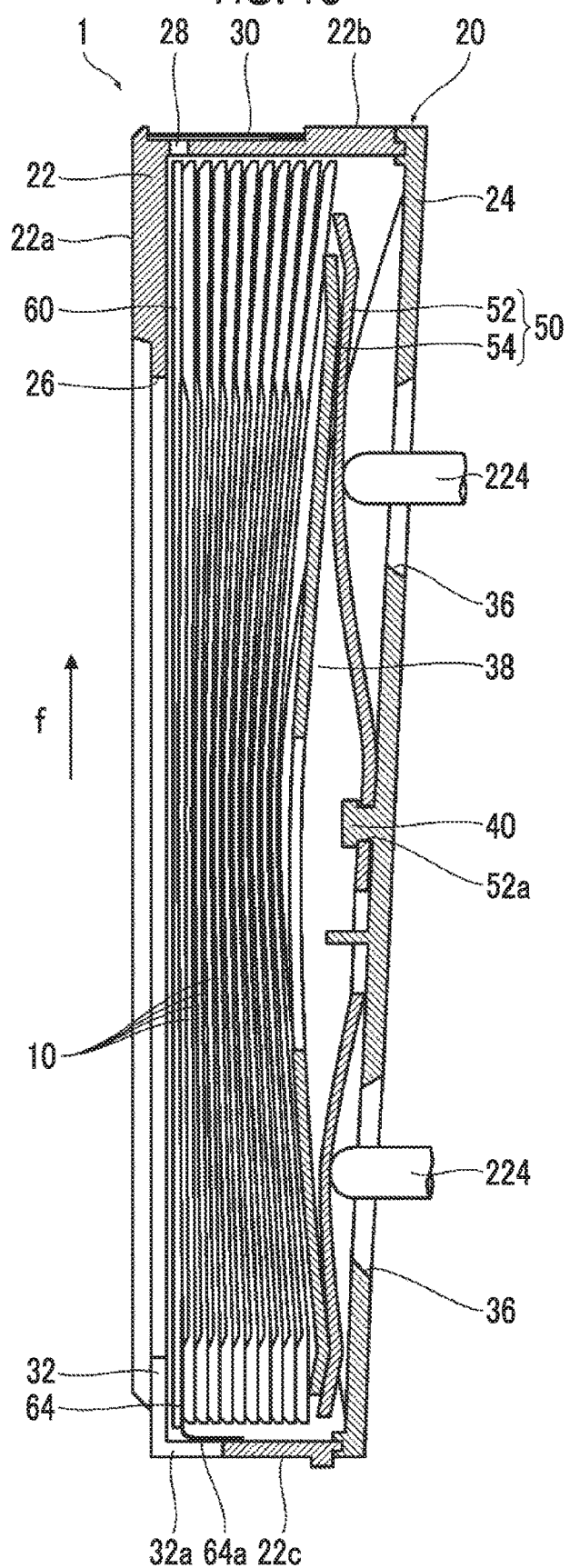
FIG. 15 is a sectional view of the instant film pack loaded in a loading chamber.

FIG. 15 is a sectional view of the instant film pack loaded in the loading chamber.

As described above, in a case where the instant film pack 1 is loaded in the loading chamber, the uplifting members 224 are inserted into the uplifting member inserting portions 36. The light shielding sheet 50 is pressed by the uplifting members inserted in the uplifting member inserting portions 36 to press the instant film 10 onto an inner surface of the case 20. Here, the first light shielding sheet 52 is elastically deformed to elastically press the instant film 10 to be pressed on the inner surface of the case 20.

<Film Cover>

The film cover 60 shields light from the exposure opening portion 26.

Figure 16:
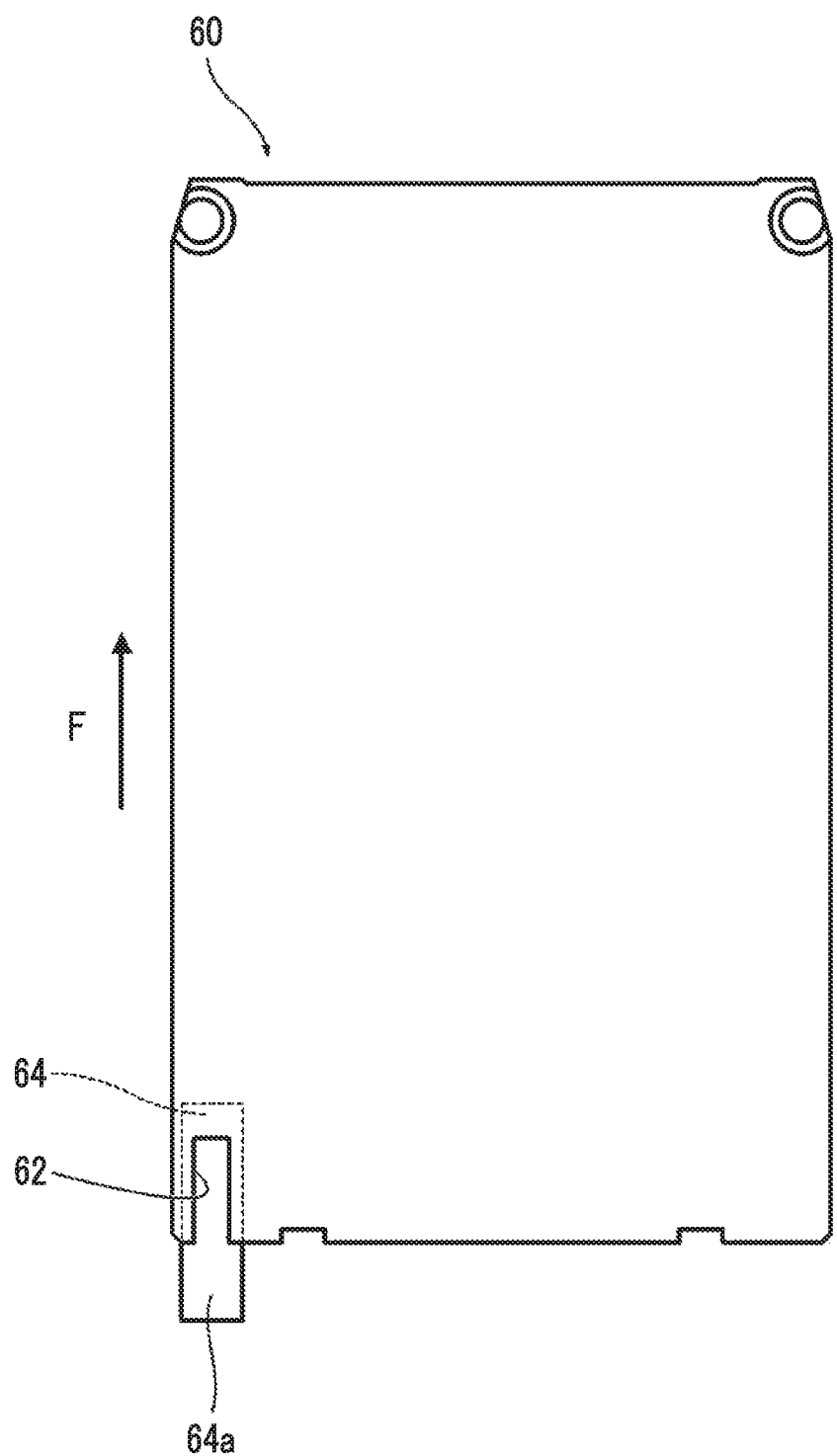
FIG. 16 is a front view of a film cover.
Figure 17:
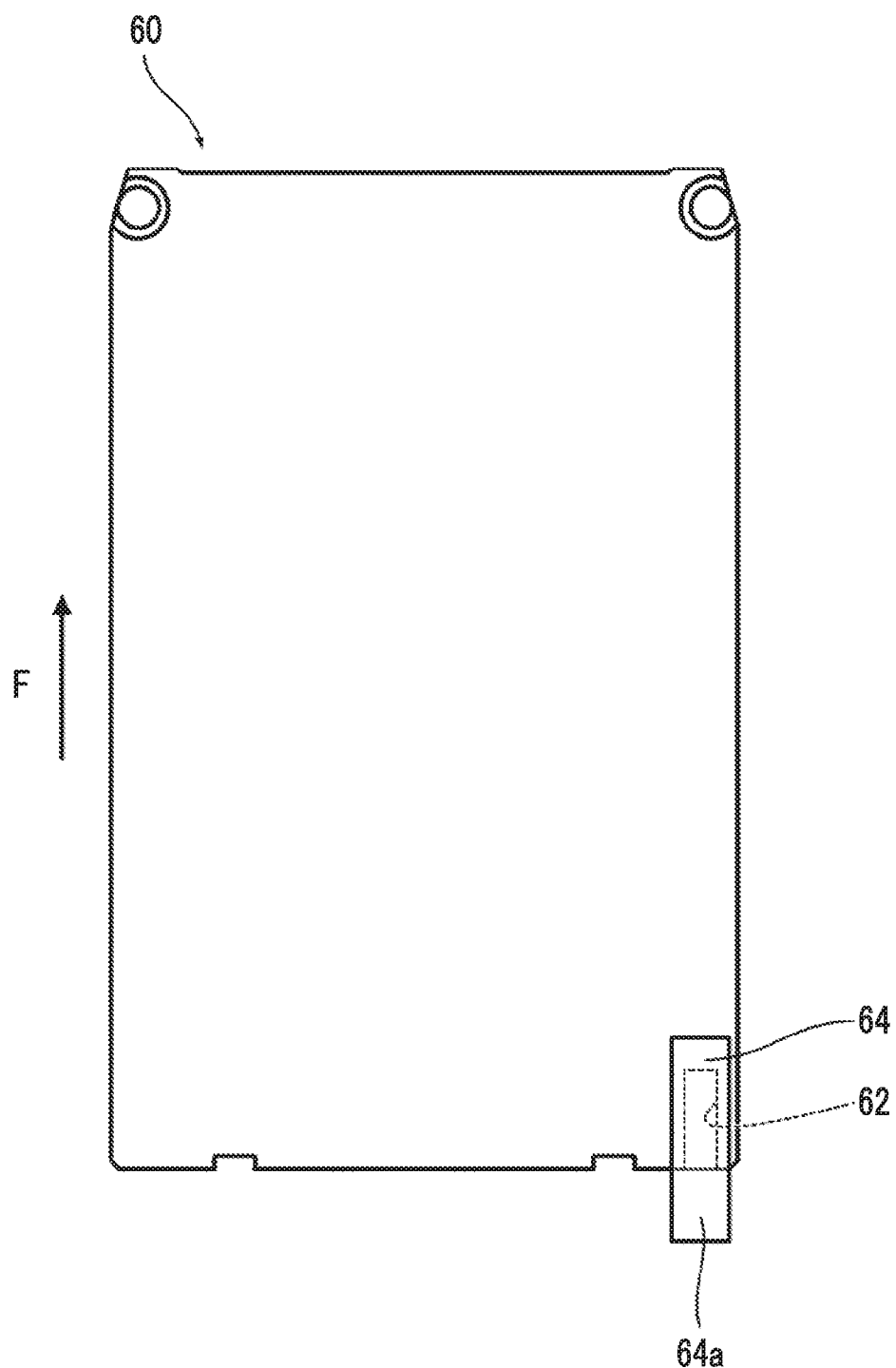
FIG. 17 is a rear view of the film cover.

FIG. 16 is a front view of the film cover. FIG. 17 is a rear view of the film cover. In FIGS. 16 and 17, the direction indicated using the arrow F is the feeding direction of the film cover 60. The direction is a direction in which the film cover 60 is discharged from the case.

The film cover 60 has a rectangular card shape that is approximately the same as that of the instant film 10. As shown in FIG. 6, the film cover 60 is disposed to overlap the topmost instant film among the laminated instant films 10, and is accommodated in the case 20.

In the film cover 60, a notched portion 62 and a film cover skirt member 64 are provided.

The notched portion 62 has a slit shape, and is provided in a back end portion of the film cover 60. The notched portion 62 is disposed along the feeding direction of the film cover 60. A position where the notched portion 62 is disposed is set as the same position as that of the claw opening portion 32. Thus, in a case where the film cover 60 is accommodated in the case 20, the notched portion 62 is disposed to be connected to the claw opening portion 32. The notched portion 62 has the same width as that of the claw opening portion 32. The same width includes approximately the same width.

The film cover skirt member 64 is an example of a light shielding member, and is mounted on the film cover 60 to shield light from the claw opening portion 32 and the notched portion 62. The film cover skirt member 64 is configured of a rectangular sheet piece. The film cover skirt member 64 is mounted on a rear surface portion of the film cover 60 to shield the notched portion 62. Here, the film cover skirt member 64 is mounted so that a part thereof protrudes from the film cover 60. The protruding portion functions as a skirt portion 64a for shielding the inlet 32a of the claw opening portion 32. In a case where the film cover 60 is accommodated in the case 20, the inlet 32a of the claw opening portion 32 is shielded by the skirt portion 64a, so that light from the inlet 32a is shielded.

The film cover skirt member 64 is formed of a material capable of being cut by a claw. That is, the film cover skirt member 64 is formed of a material capable of being cut by an inserting operation of the claw. As such a material, a metallic foil such as an aluminum foil having a light shielding characteristic may be used.

The film cover skirt member 64 may be mounted on the film cover 60 through bonding. Further, the film cover 60 mounted in the case 20 is fixed as the skirt portion 64a of the film cover skirt member 64 is bonded to the inner surface of the case 20.

<Assembly of Instant Film Pack>

The instant film pack 1 is assembled by accommodating the film cover 60 and the instant film 10 in the case body 22 and then closing the rear surface of the case body 22 using the case cover 24.

Here, first, the film cover 60 is accommodated in the case body 22. Further, the skirt portion 64a of the film cover skirt member 64 is bonded to the inner surface of the case 20. Thus, the exposure opening portion 26 and the claw opening portion 32 are shielded by the film cover 60.

Then, the instant films 10 are accommodated in the case body 22 in a state of being laminated. The instant films 10 are laminated with the exposure surfaces 10a being directed upward. Further, the instant films 10 are accommodated in the case body 22 with the exposure surfaces 10a being directed toward the exposure opening portion.

Thus, in a state where the film cover 60 is mounted on the exposure surface 10a of the instant film 10 located at the topmost position, the film cover 60 and the instant film 10 are accommodated in the case body 22. Then, the rear surface of the case body 22 is closed using the case cover 24.

Hence, the assembly of the instant film pack 1 is completed.

<Operation of Instant Film Pack>

The instant film pack 1 may have both of a configuration in which the film cover 60 is removed in use, and a configuration in which the film cover 60 is not removed in use.

The configuration in which the film cover 60 is not removed in use means a configuration in which the instant film pack 1 is loaded in a device and is then used in a state where the film cover 60 is mounted. That is, this configuration refers to a configuration in which the instant film 10 is discharged from the case 20 in use in a state where the film cover 60 is mounted. In this case, the instant film 10 is extracted from the case 20 to be exposed.

On the other hand, the configuration in which the film cover 60 is removed in use means a configuration in which the instant film pack 1 is loaded in the device and then the film cover 60 is removed in use. The configuration in which the film cover 60 is removed in use means the configuration in which the film cover 60 is discharged in use. In this case, the instant film 10 is used in a state of being loaded in the case 20. That is, exposure is performed inside the case. Further, after the exposure, the film cover 60 is discharged from the case 20. The exposure is performed with respect to the instant film 10 at the topmost position inside the case.

The discharge of the instant film 10 may be performed using a discharge mechanism on the device side. The discharge mechanism discharges the instant film 10 and the film cover 60 from the case 20 using a claw.

<Discharge Mechanism>

Figure 18:
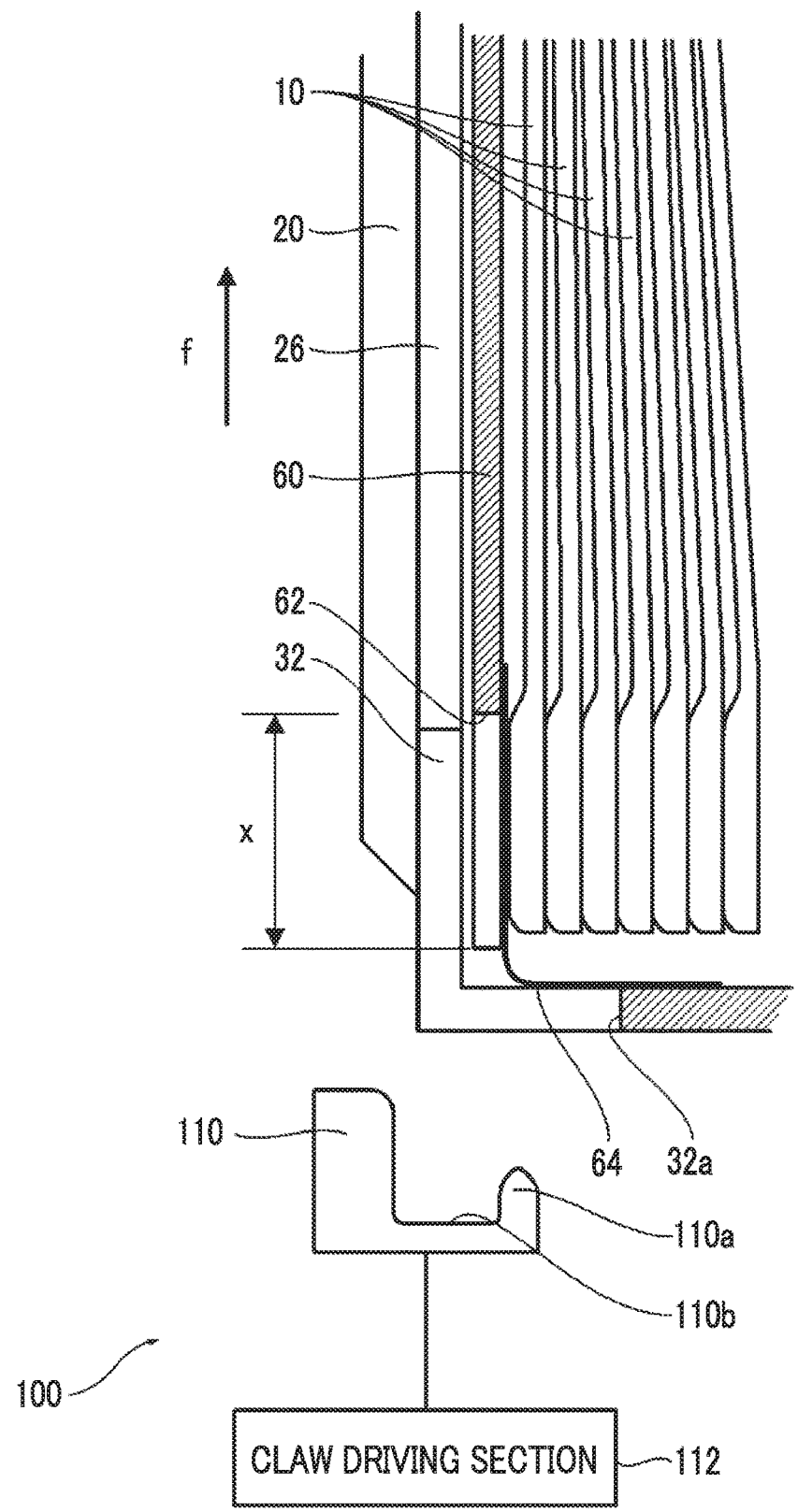
FIG. 18 is a diagram showing a schematic configuration of a discharge mechanism.

FIG. 18 is a diagram showing a schematic configuration of the discharge mechanism. In FIG. 18, the direction indicated using the arrow f is the discharge direction of the instant film.

A discharge mechanism 100 includes a claw 110, and a claw driving section 112 that drives the claw 110 along the discharge direction of the instant film 10.

The claw 110 is configured of a plate piece having a hook claw shape. The claw 110 has an insertion portion 110a. The insertion portion 110a is a portion that is inserted between the instant film 10 and the instant film 10 or between the film cover 60 and the instant film 10 in discharge. The claw 110 is configured so that the insertion portion 110a is inserted between the instant film 10 and the instant film 10 or between the film cover 60 and the instant film 10, an end portion of the instant film 10 or the film cover 60 comes into contact with a bottom portion of a concave portion 110b, and in this state, the instant film 10 or the film cover 60 is discharged from the case 20.

The claw driving section 112 moves the claw 110 along the discharge direction of the instant film 10 and the film cover 60. The claw driving section 112 includes a motor, and a power transmission mechanism that converts rotation of the motor into linear motion and transmits the linear motion to the claw.

<Discharge Operation of Instant Film and Film Cover in Discharge Mechanism>

As described above, the instant film pack 1 of this embodiment may have both of the configuration in which the film cover 60 is removed in use, and the configuration in which the film cover 60 is not removed in use.

Between the configuration in which the film cover 60 is removed in use and the configuration in which the film cover 60 is not removed in use, discharge operations in the discharge mechanism 100 are different from each other. Specifically, strokes for moving the claw 110 are different from each other. Hereinafter, the discharge operations of the instant film 10 in the configuration in which the film cover 60 is removed in use and the configuration in which the film cover 60 is not removed in use will be respectively described.

(1) In a Case where a Film Cover is not Removed in Use

Figure 19:
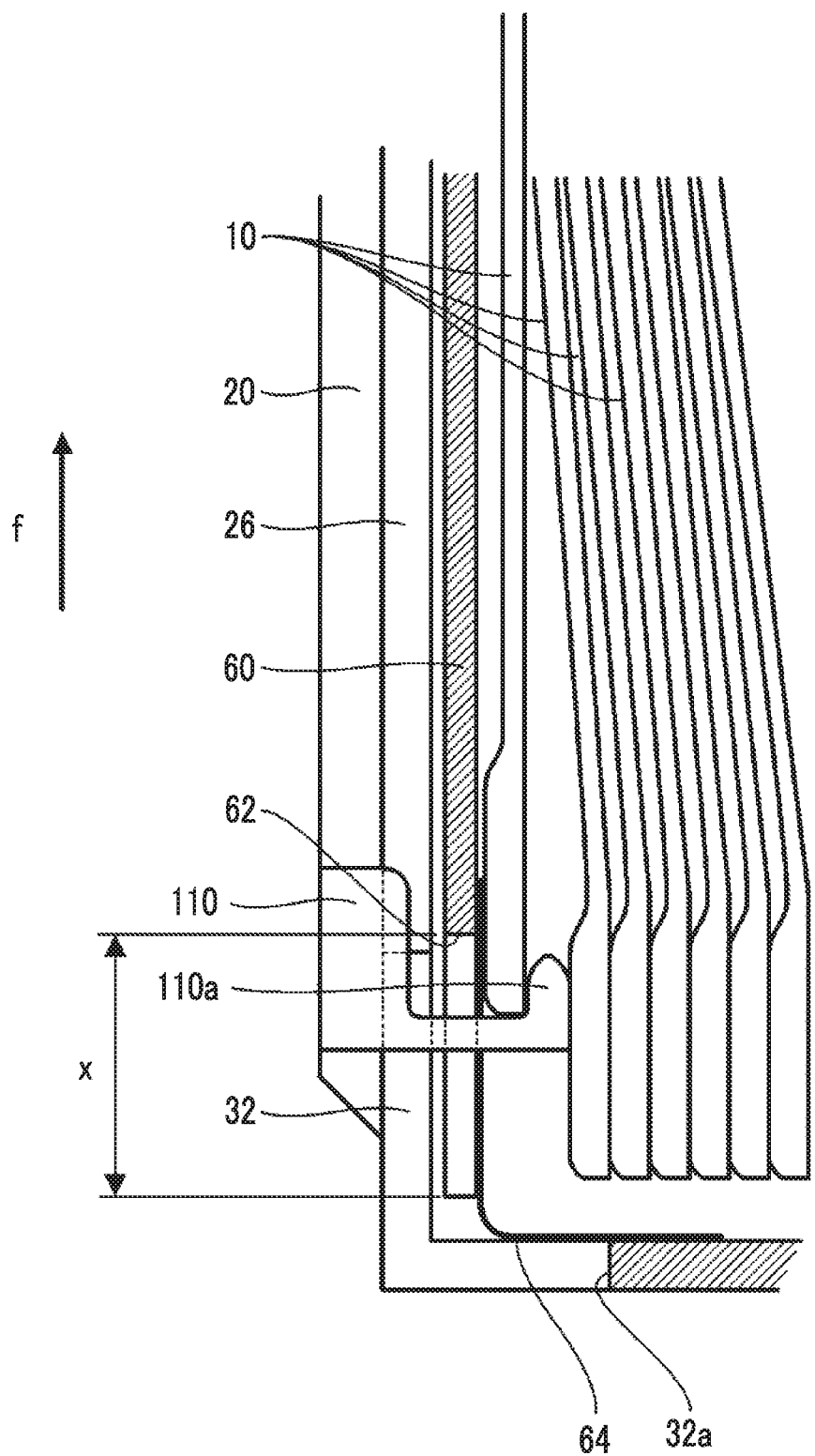
FIG. 19 is a diagram illustrating an operation of the discharge mechanism in a case where the film cover is not removed.

FIG. 19 is a diagram illustrating an operation of a discharge mechanism in a case where the film cover is not removed.

In a case where the film cover 60 is not removed in use, the insertion portion 110a of the claw 110 is inserted between the first instant film 10 and the second instant film 10, and the claw 110 is moved in a first stroke.

Here, the first stroke refers to a stroke that is set so that the claw 110 is moved within a range that does not exceed a range x of the notched portion 62 provided in the film cover 60.

As shown in FIG. 19, the film cover 60 accommodated in the case 20 is disposed so that the notched portion 62 overlaps the claw opening portion 32. As a result, in a case where the claw 110 is inserted into the claw opening portion 32, the claw 110 is inserted into the notched portion 62. Further, in the range x of the notched portion 62, as shown in FIG. 19, the claw 110 moves inside the case 20 without coming in contact with the film cover 60. As a result, it is possible to discharge only the instant film 10 from the case 20 without pressing out the film cover 60 using the claw 110.

In a case where the claw 110 is moved within a range that exceeds the range x of the notched portion 62, the claw 110 comes into contact with the film cover 60. Accordingly, in a case where the claw 110 is moved while exceeding the range x of the notched portion 62, the film cover 60 is pressed out by the claw 110.

Accordingly, in a case where the film cover 60 is not removed in use, the insertion portion 110a of the claw 110 is inserted between the first instant film 10 and the second instant film 10, and the claw 110 is moved within a range that does not exceed the notched portion 62. Thus, it is possible to discharge the instant film 10 in a state where the film cover 60 is mounted.

(2) In a Case where the Film Cover is Removed in Use

Figure 20:
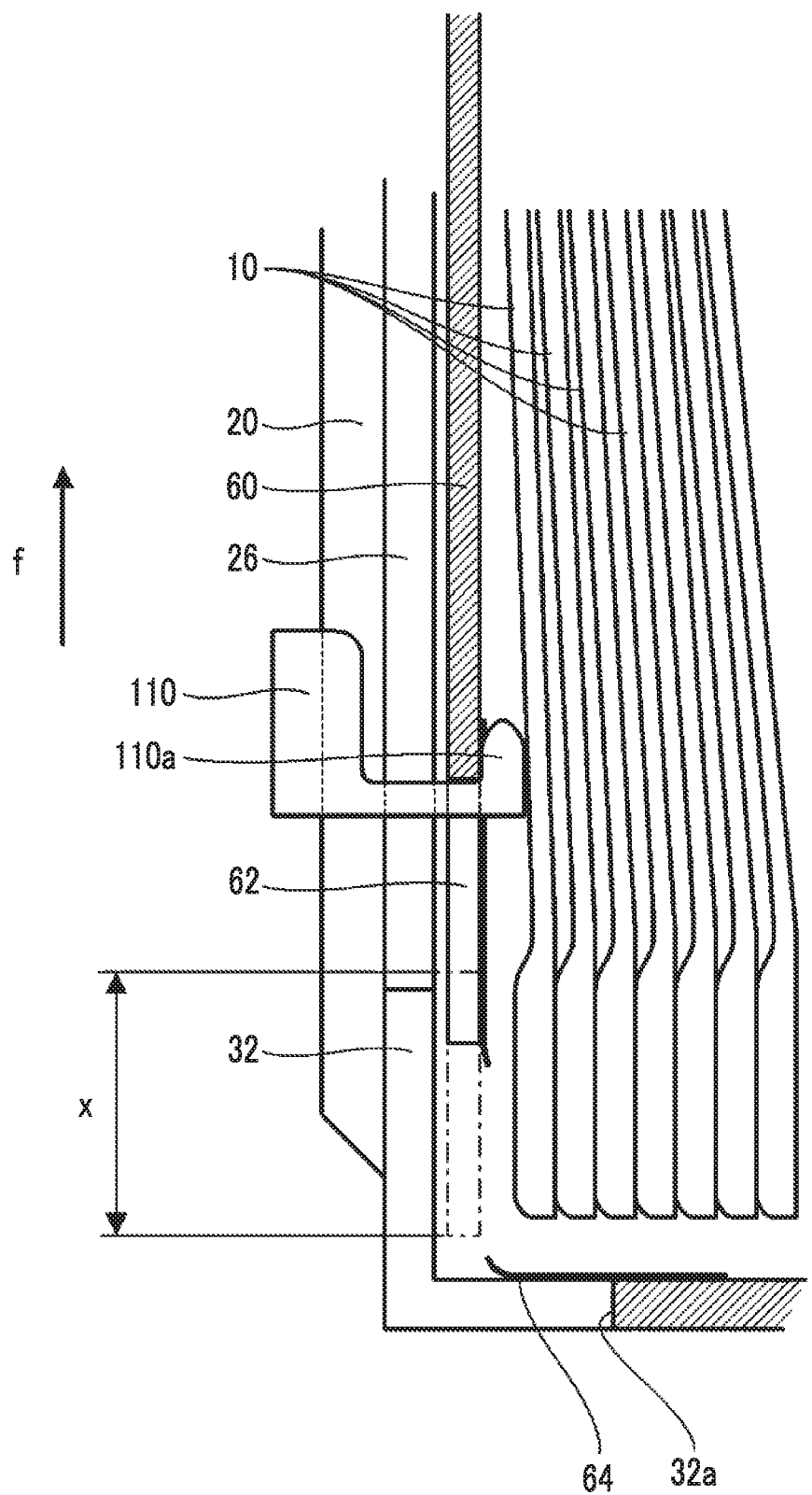
FIG. 20 is a diagram illustrating an operation of the discharge mechanism in a case where the film cover is removed in use.

FIG. 20 is a diagram illustrating an operation of the discharge mechanism in a case where the film cover is removed in use.

In a case where the film cover 60 is removed, the insertion portion 110a of the claw 110 is inserted between the film cover 60 and the first instant film 10, and the claw 110 is moved in a second stroke.

Here, the second stroke refers to a stroke that is set so that the claw 110 is moved within a range that exceeds the range x of the notched portion 62 provided in the film cover 60.

As described above, in a case where the claw 110 is inserted into the claw opening portion 32, the claw 110 is inserted into the notched portion 62. Further, in the range x of the notched portion 62, the claw 110 moves inside the case 20 without coming in contact with the film cover 60. As a result, in the range x of the notched portion 62, the claw 110 moves inside the case without pressing out the film cover 60.

On the other hand, in a case where the claw 110 is moved within a range that exceeds the range x of the notched portion 62, as shown in FIG. 20, the film cover 60 comes into contact with the bottom portion of the concave portion 110b of the claw 110, and the film cover 60 is pressed out by the claw 110.

Accordingly, in a case where the film cover 60 is removed, the insertion portion 110a of the claw 110 is inserted between the film cover 60 and the first instant film 10, and the claw 110 is moved within a range that exceeds the notched portion 62. Thus, it is possible to discharge the film cover 60 from the case 20.

The film cover 60 pressed out by the claw 110 is discharged through the discharge port 28, in a similar way to the instant film 10.

The above-described operation is an operation in a case where the film cover 60 is discharged. Here, in a case where the instant film 10 is discharged, the claw 110 may be moved in a stroke shorter than the second stroke. That is, after the film cover 60 is discharged, the claw 110 may be moved in a stroke capable of discharging the instant film 10.

As described above, the instant film pack 1 of this embodiment may have both of the configuration in which the film cover 60 is removed in use, and the configuration in which the film cover 60 is not removed in use.

The claw opening portion 32 and the notched portion 62 are shielded by the film cover skirt member 64, but since the film cover skirt member 64 is formed of a material capable of being cut by the claw 110, the film cover skirt member 64 is cut when the claw 110 is inserted into the claw opening portion 32.

Second Embodiment

<Structure of Instant Film Pack>

Figure 21:
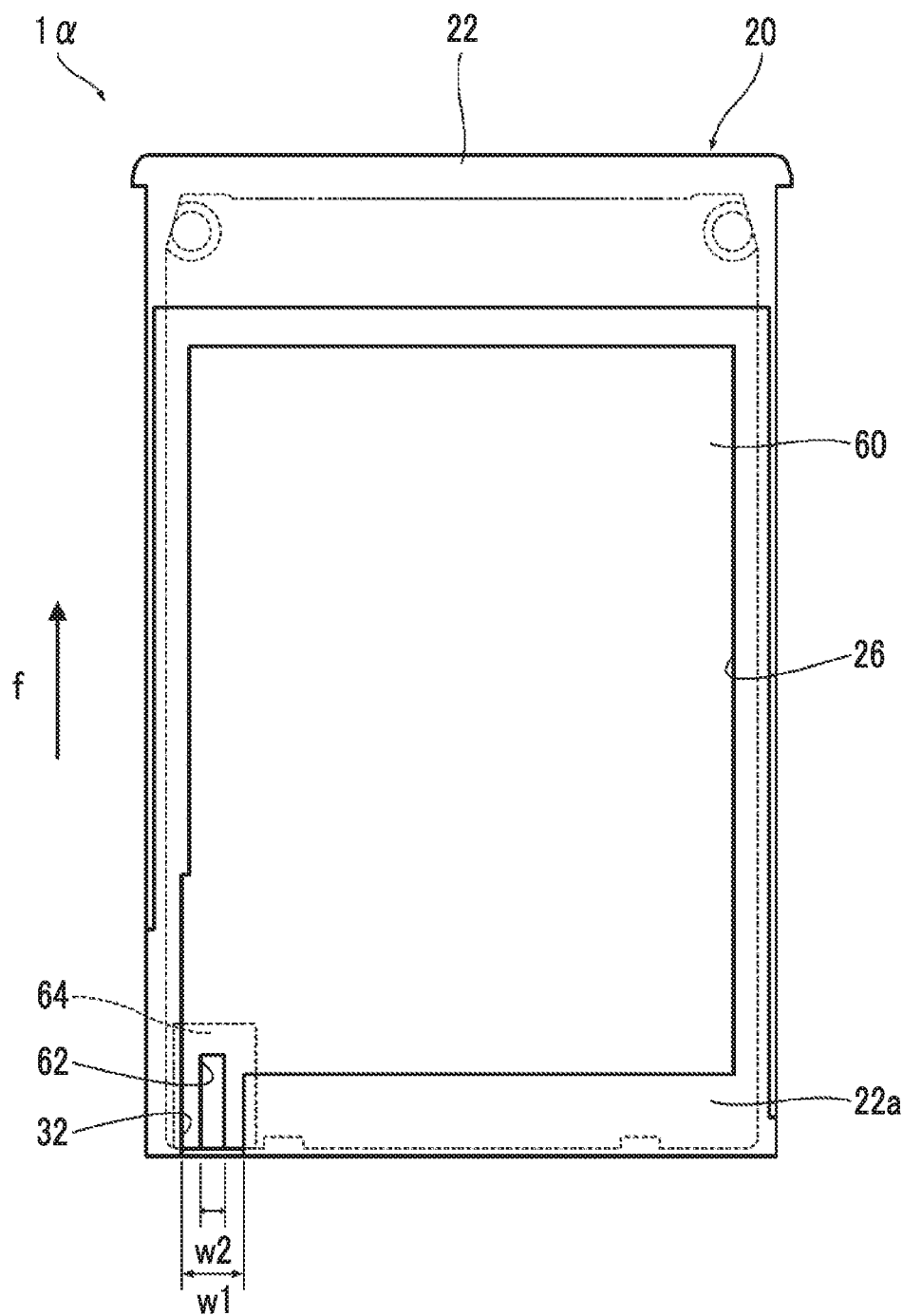
FIG. 21 is a front view of the instant film pack.

FIG. 21 is a front view of an instant film pack.

In an instant film pack 1α of this embodiment, a width w1 of the claw opening portion 32 provided in the case 20 and a width w2 of the notched portion 62 provided in the film cover 60 are different from each other. The other configurations are the same as in the instant film pack 1 in the first embodiment. Accordingly, only different points will be described hereinafter.

In the instant film pack 1α of this embodiment, the width w2 of the notched portion 62 provided in the film cover 60 is set to be narrower than the width w1 of the claw opening portion 32 provided in the case 20.

<Operation of Instant Film Pack>

In the instant film pack 1α of this embodiment, a claw to be used in a case where the film cover 60 is removed in use and a claw to be used in case where the film cover 60 is not removed in use are different from each other.

(1) In a Case where the Film Cover is Removed in Use

Figure 22:
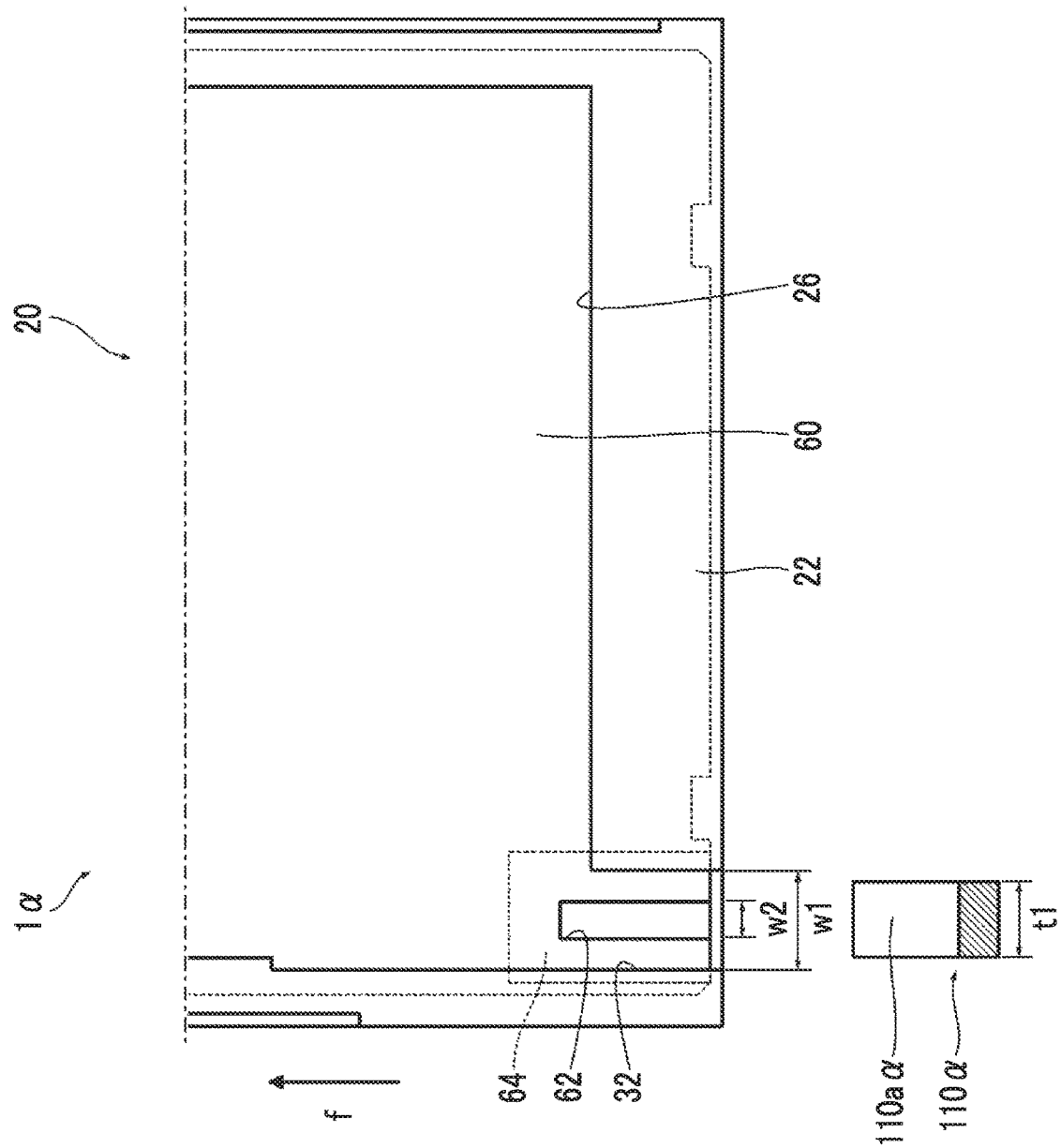
FIG. 22 is a diagram illustrating an operation in a case where the film cover is removed in use.

FIG. 22 is a diagram illustrating an operation in a case where the film cover is removed in use.

In a case where the film cover 60 is removed in use, a claw that is not capable of being inserted into the notched portion 62 of the film cover 60 is used. The claw is referred to as a first claw 110α.

The first claw 110α is configured of a claw having a thickness that is greater than the width w2 of the notched portion 62 and is smaller than the width w1 of the claw opening portion 32. That is, the first claw 110α is configured of a claw that satisfies a relationship of w2<t1<w1 where the thickness is t1.

In a case where the film cover 60 is removed, an insertion portion 110αα of the first claw 110α is inserted between the film cover 60 and the first instant film 10, and the first claw 110α is moved in a predetermined stroke. Here, the stroke is set to such an amount that the film cover 60 can be discharged from the case 20.

As described above, the first claw 110α has the thickness t1 greater than the width w2 of the notched portion 62. Accordingly, even though the first claw 110α is inserted into the claw opening portion 32, the first claw 110α cannot enter the notched portion 62. As a result, the film cover 60 is pressed out by the first claw 110α, and is then discharged from the case 20.

Similarly, in a case where the instant film 10 is discharged, the first claw 110α is moved in a predetermined stroke. Thus, the instant film 10 can be discharged from the case 20.

(2) In a Case where the Film Cover is not Removed in Use

Figure 23:
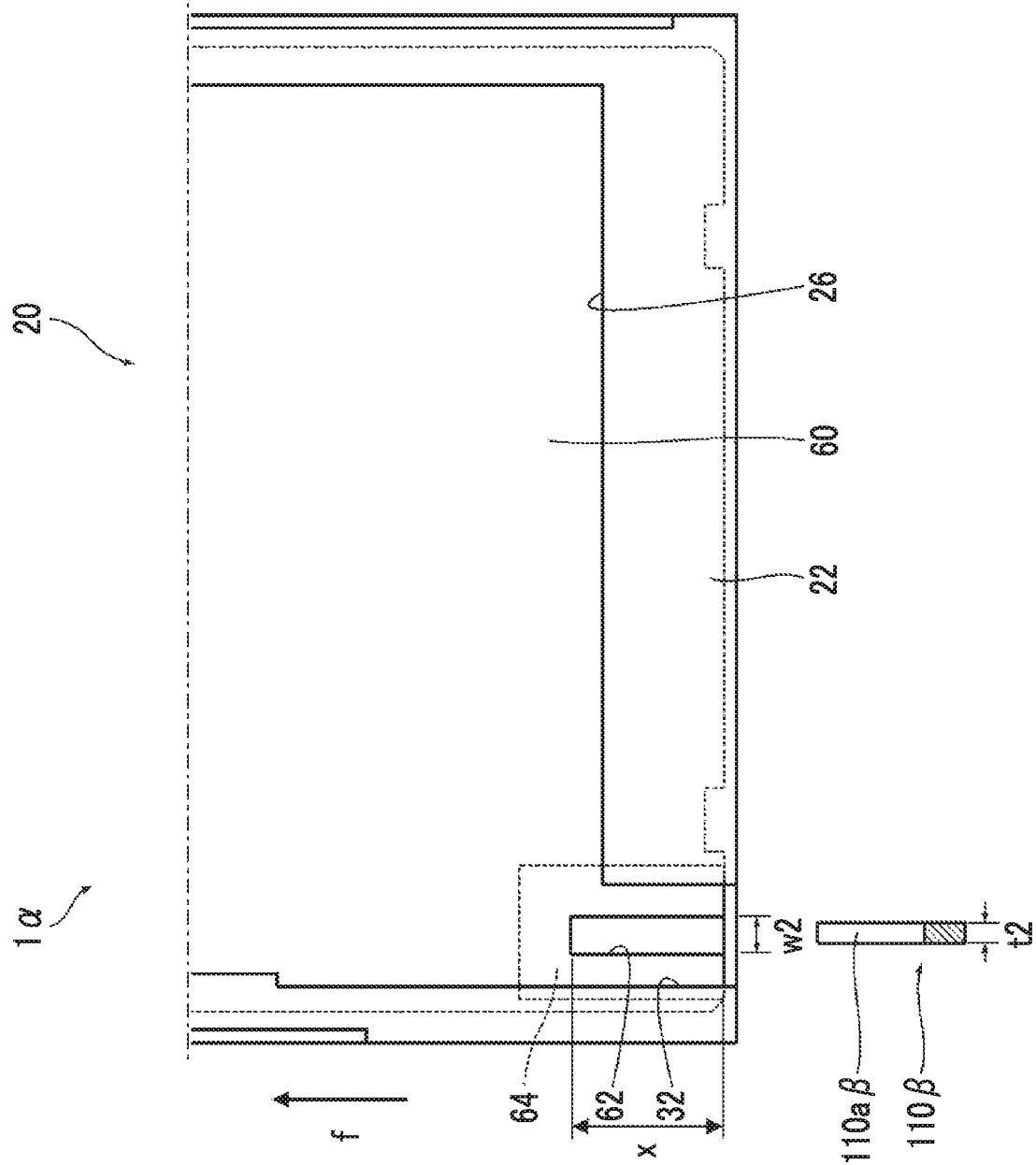
FIG. 23 is a diagram illustrating an operation in a case where the film cover is not removed in use.

FIG. 23 is a diagram illustrating an operation in a case where the film cover is not removed in use.

In a case where the film cover 60 is not removed in use, a claw that is capable of being inserted into the notched portion 62 of the film cover 60 is used. The claw is referred to as a second claw 110β.

The second claw 110β is configured of a claw having a thickness that is smaller than the width w2 of the notched portion 62. That is, the second claw 110β is configured of a claw that satisfies a relationship of t2<w2 where the thickness is t2.

In a case where the instant film 10 is discharged, an insertion portion 110β of the second claw 110β is inserted between the first instant film 10 and the second instant film 10, and the second claw 110β is moved in a predetermined stroke. Here, the stroke is set to a range that does not exceed the range x of the notched portion 62 provided in the film cover 60.

As described above, the second claw 110β has the thickness t2 smaller than the width w2 of the notched portion 62. Accordingly, in a case where the second claw 110β is inserted into the claw opening portion 32, the second claw 110β is inserted into the notched portion 62. Thus, it is possible to selectively discharge only the instant film 10 without pressing out the film cover 60.

As described above, the instant film pack 1α of this embodiment may have both of the configuration in which the film cover 60 is removed in use, and the configuration in which the film cover 60 is not removed in use.

[Modification Example of Instant Film Pack]

<Modification Example of Light Shielding Member>

In the above-described embodiments, a configuration in which the film cover skirt member that is a light shielding member that shields light from the claw opening portion and the notched portion can be cut is shown, but the configuration of the light shielding member is not limited thereto.

For example, a configuration in which the film cover skirt member that is the light shielding member is configured of a flexible sheet material such as a resin film to be deformable may be used. In this case, the film cover skirt member is deformed by being pressed by a claw by inserting the claw into the claw opening portion and the notched portion.

Further, a structure in which the claw opening portion and the notched portion are opened or closed in a sliding door shape may be used. For example, a structure in which a sheet-shaped light shielding member is provided to be moved in a sliding manner in the claw opening portion and the notched portion and slides to open or close the claw opening portion and the notched portion may also be used. Alternatively, a structure in which a light shielding member is stretched or contracted in a bellows shape to open or close the claw opening portion and the notched portion may also be used.

<Modification Example of Light Shielding Structure in Film Cover>

In the above embodiments, a structure in which the film cover is disposed to overlap the instant film in the case and the exposure opening portion is shielded from the inside of a case is shown, but the structure in which the exposure opening portion is shielded is not limited thereto.

Figure 24:
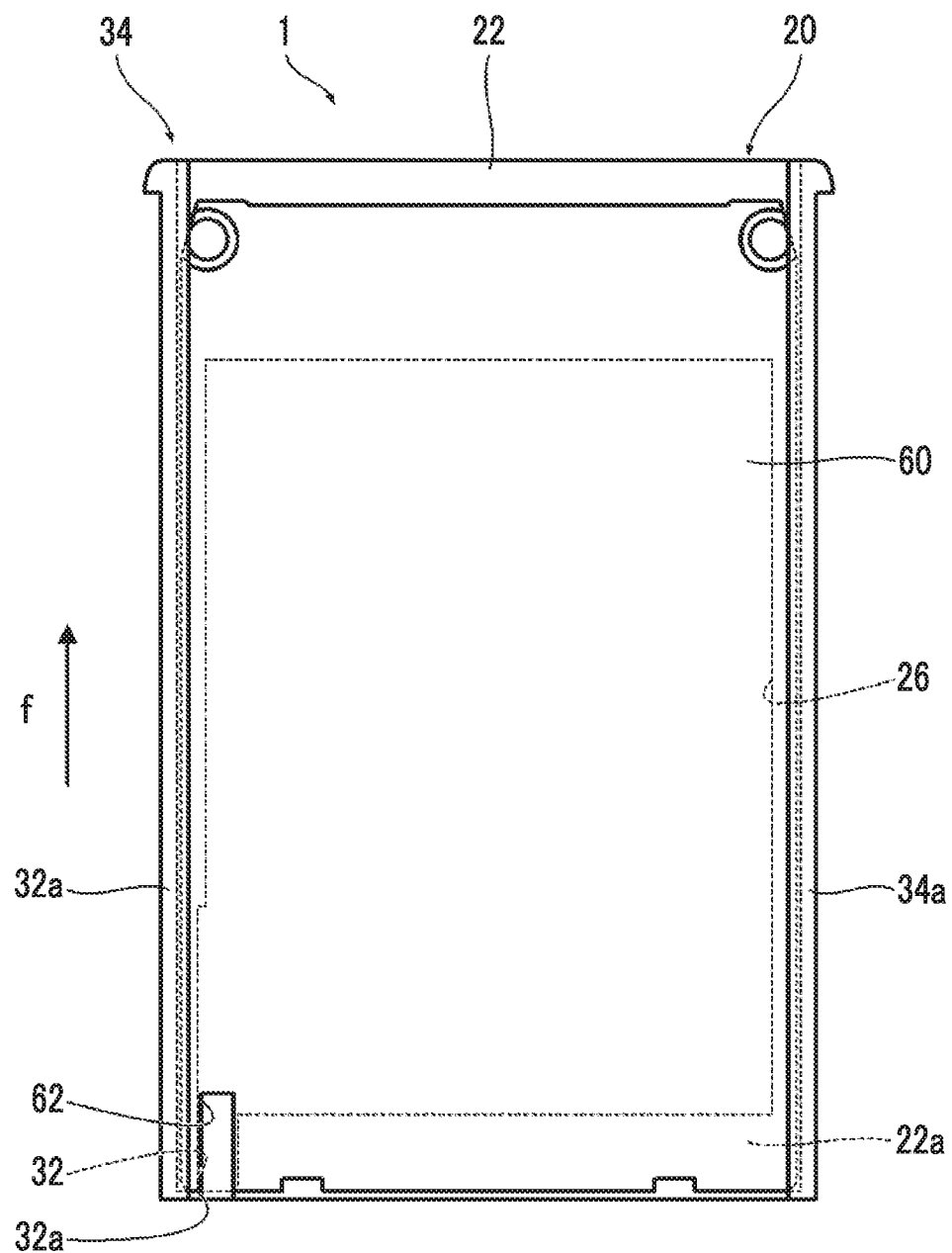
FIG. 24 is a front view of the instant film pack in a structure in which an exposure opening portion is shielded from the outside of a case.
Figure 25:
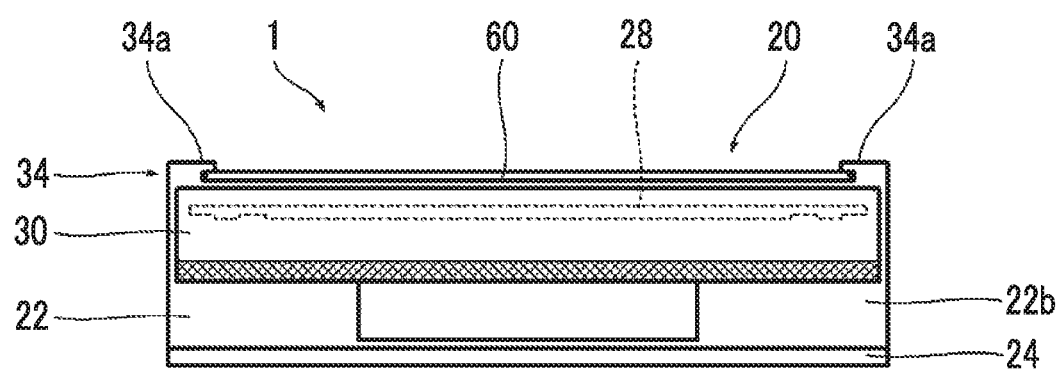
FIG. 25 is a plan view of the instant film pack in the structure in which the exposure opening portion is shielded from the outside of the case.

FIG. 24 is a front view of the instant film pack in a structure in which the exposure opening portion is shielded from the outside of the case. FIG. 25 is a plan view thereof. In FIGS. 24 and 25, the direction indicated using the arrow f is the discharge direction of the instant film 10.

As shown in FIGS. 24 and 25, the case 20 in this example is provided with a film cover mounting portion 34 in the front surface portion 22a of the case body 22.

The film cover mounting portion 34 is configured of a pair of rails 34a disposed along the discharge direction f. The film cover 60 is inserted into the pair of rails 34a to thereby be mounted to the case 20. The exposure opening portion 26 of the case 20 is covered and shielded by the film cover 60 from the outside of the case 20.

[Image Recording Device]

Next, an image recording device that records an image on an instant film using the instant film pack will be described.

<Printer>
<Configuration>

Figure 26:
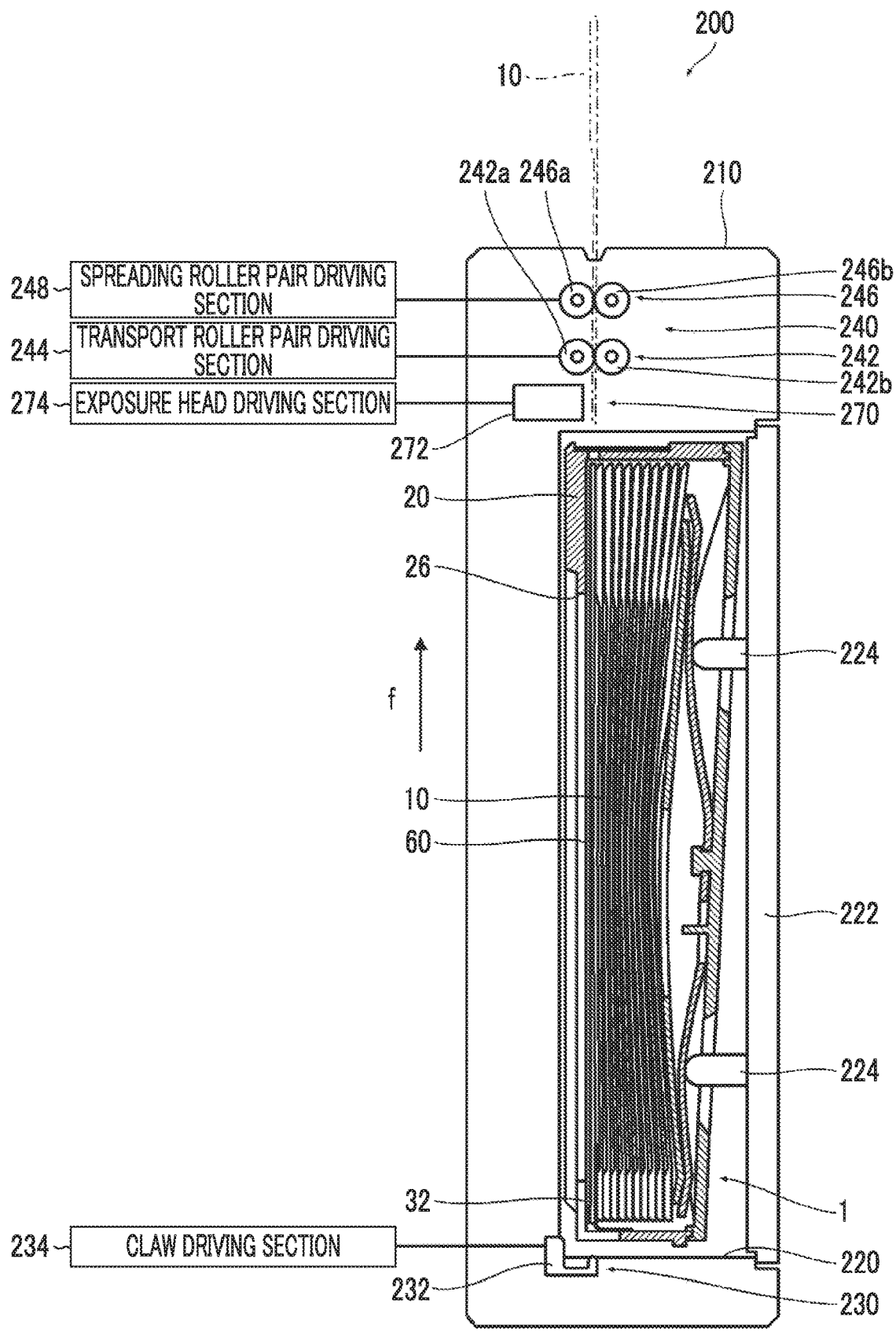
FIG. 26 is a diagram showing a schematic configuration of a printer.
Figure 27:
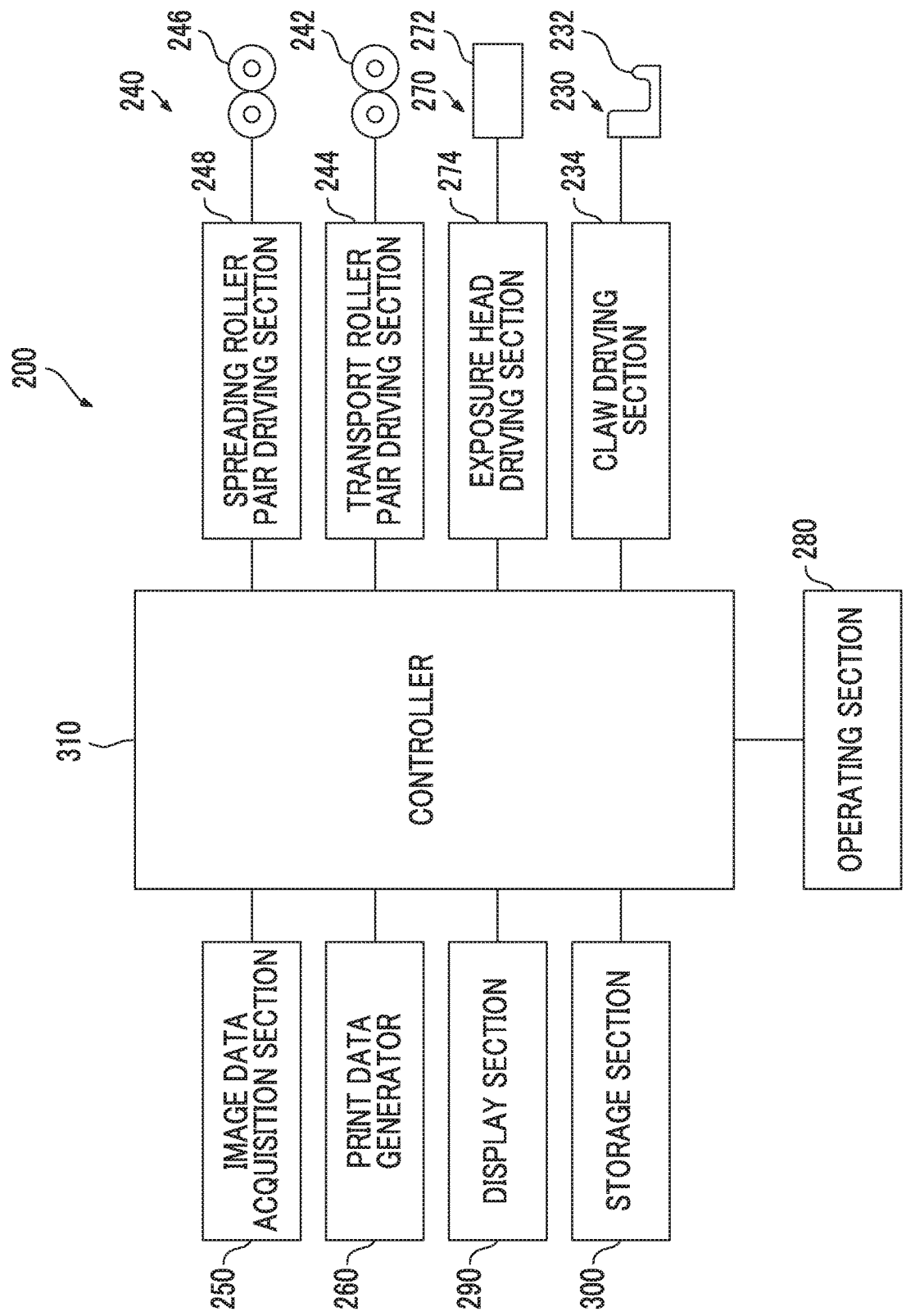
FIG. 27 is a block diagram showing a control system of the printer.

FIG. 26 is a diagram showing a schematic configuration of a printer. In FIG. 26, the direction indicated by the arrow f is the discharge direction of the instant film 10. FIG. 27 is a block diagram showing a control system of the printer.

A printer 200 is an example of the image recording device, and records an image acquired from an external device or the like on the instant film 10 using the instant film pack 1. Particularly, the printer 200 in this example is a printer of a type in which an image is recorded by a single pass using a line-type exposure head. The printer 200 includes a housing 210 in which a light shielding characteristic is secured, a loading chamber 220 in which the instant film pack 1 is loaded, a discharge section 230 that discharges the instant film 10 from the instant film pack 1 loaded in the loading chamber 220, a transport section 240 that transports the instant film 10 discharged by the discharge section 230, an image data acquisition section 250 that acquires image data of an image to be recorded on the instant film 10, a print data generator 260 that generates image data for printing, a recording section 270 that records the image on the instant film 10 transported by the transport section 240, an operating section 280, a display section 290, a storage section 300, and a controller 310.

The loading chamber 220 is provided in the housing 210 as a concave portion capable of accommodating the instant film pack 1. The instant film pack 1 is loaded in the loading chamber 220 with the exposure opening portion 26 being directed toward a bottom surface of the loading chamber 220. In a case where the instant film pack 1 is loaded in the loading chamber 220, the instant film pack 1 is positioned at a predetermined position.

The loading chamber 220 has a loading chamber cover 222, and is opened or closed by the loading chamber cover 222. The loading chamber cover 222 is provided with uplifting members 224. In a case where the instant film pack 1 is loaded in the loading chamber 220 and the loading chamber cover 222 is closed, the uplifting members 224 are inserted into the uplifting member inserting portions 36 of the instant film pack 1. Thus, the instant film 10 in the case is pressed by the uplifting members 224 to be pressed against an inner surface of the case 20.

The discharge section 230 discharges the instant film 10 from the instant film pack 1 loaded in the loading chamber 220 one by one. A configuration of the discharge section 230 is the same as that of the above-described discharge mechanism 100 of the instant film 10. That is, the discharge section 230 includes a claw 232, and a claw driving section 234 that moves the claw 232 along the discharge direction of the instant film 10. The discharge section 230 discharges the instant film 10 from the case 20 by inserting the claw 232 through the claw opening portion 32 with respect to the instant film pack 1 loaded in the loading chamber 220 and pressing out the instant film 10 in the case using the claw 232. Here, the claw 232 is moved within a range of the notched portion 62 to discharge the instant film 10. Thus, it is possible to discharge only the instant film in a state where the film cover 60 is mounted.

In a case where the instant film pack a1 of the second embodiment is used, a claw having a thickness capable of being inserted into the notched portion 62 is used as the claw 232.

The transport section 240 transports the instant film 10 discharged from the case 20 by the discharge section 230 at a predetermined speed, and spreads a development processing liquid in the transport process. The transport section 240 includes a transport roller pair 242, a transport roller pair driving section 244 that drives the transport roller pair 242 to be rotatable, a spreading roller pair 246, and a spreading roller pair driving section 248 that drives the spreading roller pair 246 to be rotatable.

The transport roller pair 242 includes a transport driving roller 242a and a transport driven roller 242b. The transport roller pair 242 is configured so that the instant film 10 is sandwiched by the transport driving roller 242a and the transport driven roller 242b. The transport driving roller 242a is configured to come in contact with only both sides of the instant film 10.

The transport roller pair driving section 244 includes a motor, and a rotation transmission mechanism that transmits rotation of the motor to the transport driving roller 242a.

The spreading roller pair 246 is disposed on a downstream side of the transport roller pair 242 in a transport direction of the instant film 10. The spreading roller pair 246 includes a spreading driving roller 246a and a spreading driven roller 246b. The spreading roller pair 246 transports the instant film 10 with the instant film 10 being sandwiched by the spreading driving roller 246a and the spreading driven roller 246b. Further, the spreading roller pair 246 squeezes out the pod portion 14 of the instant film 10 in the transport process to spread the development processing liquid.

The spreading roller pair driving section 248 includes a motor, and a rotation transmission mechanism that transmits rotation of the motor to the spreading driving roller 246a.

The image data acquisition section 250 acquires image data of an image recorded on the instant film 10. The image data acquisition section 250 communicates with an external device such as a digital camera, a smartphone, or a mobile phone in a wired or wireless manner, and acquires image data of the image recorded on the instant film 10. The communication method is not particularly limited.

Further, the image data acquisition section 250 has a card slot (not shown), and acquires image data to be recorded on the instant film 10 from a memory card loaded in the card slot.

The print data generator 260 generates print data that is image data for printing from image data acquired by the image data acquisition section 250. That is, the print data generator 260 converts the image data into a data format capable of being recorded in the recording section 270.

The recording section 270 records an image on the instant film 10 on the basis of print data generated by the print data generator 260. The recording section 270 includes an exposure head 272, and an exposure head driving section 274 that drives the exposure head 272. The exposure head 272 is disposed on an upstream side of the transport roller pair 242 in the transport direction of the instant film 10. The exposure head 272 is configured of a line-type exposure head, and irradiates the exposure surface 10a of the instant film 10 transported by the transport roller pair 242 with print light line by line to record the image on the instant film 10. The exposure head driving section 274 drives the exposure head 272 on the basis of the print data.

The operating section 280 is provided to perform various operations with respect to the printer 200. The operating section 280 includes an operating member such as an operating button, and outputs information based on an operation of the operating member to the controller 310.

The display section 290 displays an image to be recorded on the instant film 10. Further, the display section 290 displays a setting of the printer 200, an operating status, a warning, or the like. The display section 290 includes a display configured of a liquid crystal display (LCD) or the like, and a drive circuit thereof, for example.

The storage section 300 stores image data acquired from the image data acquisition section 250. The storage section 300 includes a non-volatile memory and a drive circuit thereof.

The controller 310 generally controls the entire operations of the printer 200. The controller 310 is configured of a microcomputer, for example.

<Operation>

In order to prevent exposure of the instant film 10, the instant film pack 1 is loaded in the loading chamber 220 in a state where the film cover 60 is mounted. In the printer 200, the instant film pack 1 is used in a state where the film cover 60 is not removed. Accordingly, even though the instant film pack 1 is loaded in the loading chamber 220, the discharge process of the film cover 60 is not performed.

In a case where image data of an image to be recorded on the instant film 10 is acquired by the image data acquisition section 250 and a printing instruction is given through the operating section 280, a printing process is started.

First, print data of an image to be printed is generated by the print data generator 260.

Then, the discharge section 230 is driven, and then, one instant film 10 is discharged from the case 20. The discharged instant film 10 is the instant film 10 disposed at the topmost position in the case in the laminating direction. The discharge section 230 moves the claw 232 along the discharge direction, and causes the claw 232 to enter the case, to thereby discharge the instant film 10. The claw 232 enters the case through the claw opening portion 32 of the case 20, and presses out the instant film 10 in the case through the discharge port 28. Here, the claw 232 is moved within a range of the notched portion 62 of the film cover 60 to press out the instant film 10. Thus, in a state where the film cover 60 is mounted, only the instant film can be discharged.

In synchronization with the discharge of the instant film 10 using the discharge section 230, the transport section 240 is driven. The transport section 240 receives the instant film 10 discharged through the discharge port 28 of the case 20, and transports the instant film 10 at a predetermined speed. In synchronization with the transport, the exposure head 272 is driven, and the image is recorded on the instant film 10.

The instant film 10 on which the image is recorded is spread by a development processing liquid by the spreading roller pair 246 to be developed in a process of being transported by the transport section 240. Further, the developed instant film 10 is discharged from the housing 210.

As described above, according to the printer 200 of this embodiment, it is possible to record an image on the instant film 10 without discharging the film cover 60. Thus, it is possible to simplify a configuration of the transport section 240, and to record a high-quality image with a compact configuration.

<Digital Camera>
<Configuration>

Figure 28:
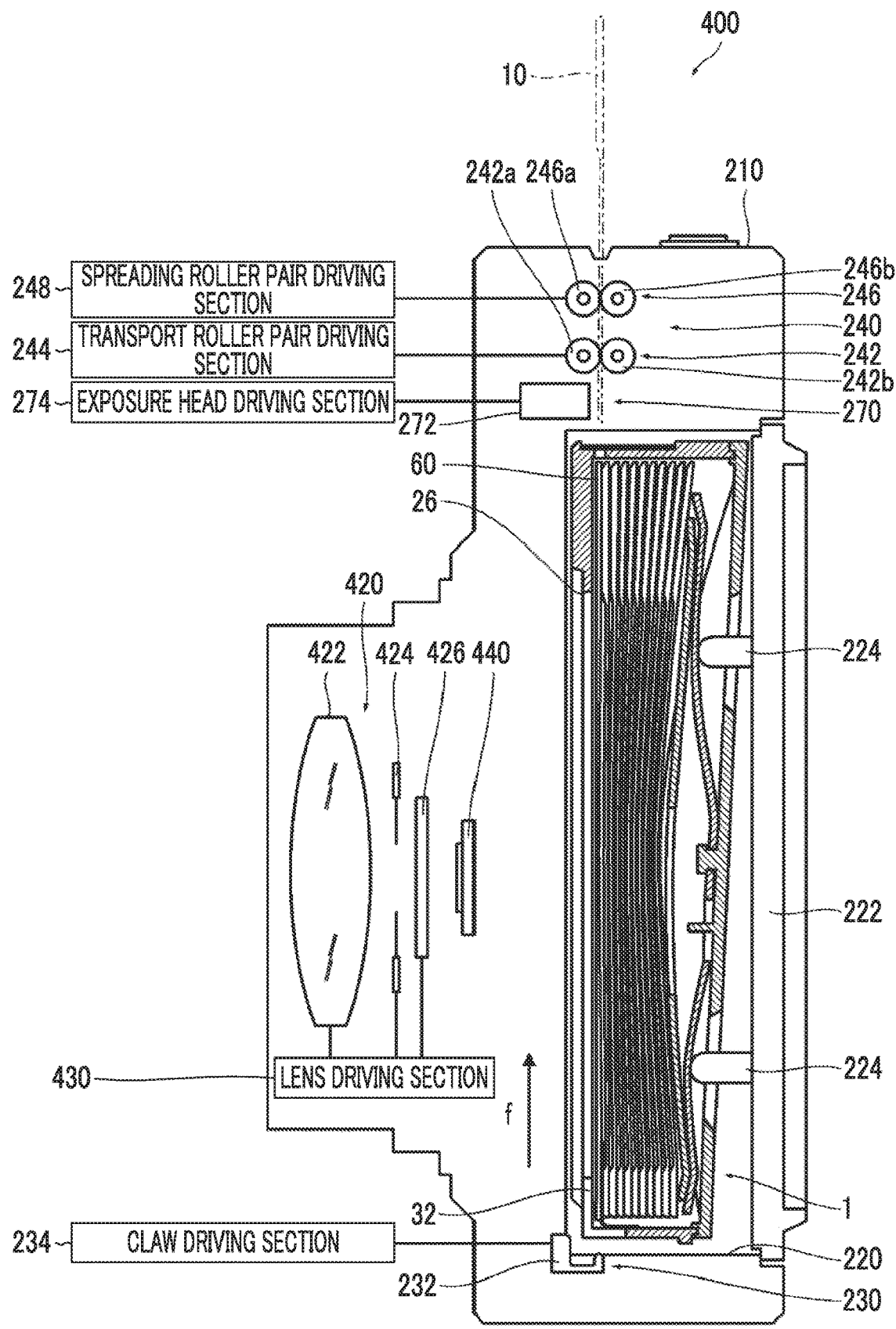
FIG. 28 is a diagram showing a schematic configuration of a digital camera.
Figure 29:
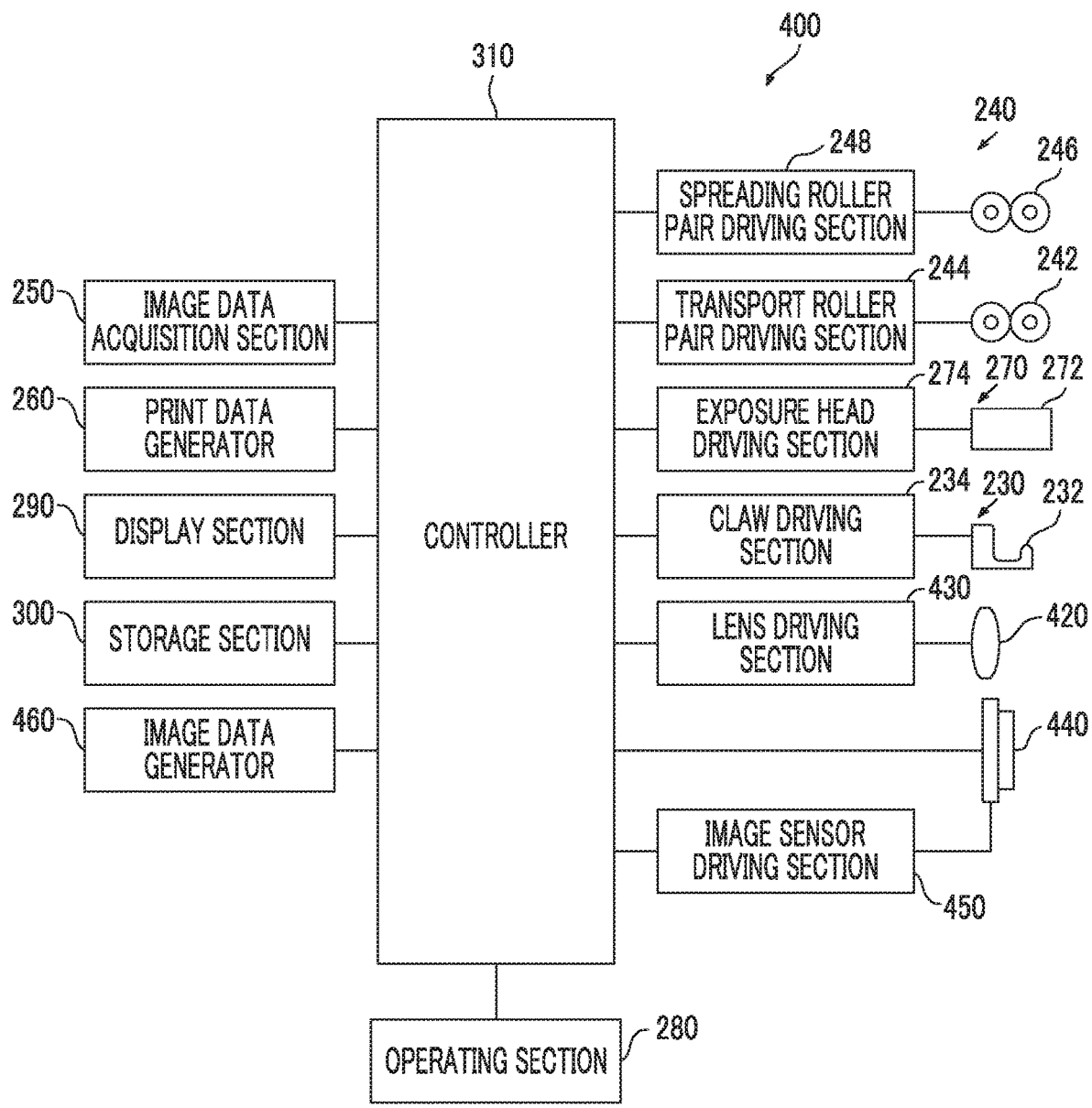
FIG. 29 is a block diagram showing a control system of the digital camera.

FIG. 28 is a diagram showing a schematic configuration of a digital camera. In FIG. 28, the direction indicated using the arrow f is the discharge direction of the instant film 10. FIG. 29 is a block diagram showing a control system of the digital camera.

A digital camera 400 is an example of an image recording device, and records a captured image on the instant film 10 using the instant film pack 1.

The digital camera 400 is configured as a digital camera with a printer. That is, the digital camera 400 includes a printer section and a digital camera section. A configuration of the printer section is the same as in the above-described printer 200. Accordingly, a configuration of the digital camera section will be described hereinafter.

The digital camera section includes a lens section 420, a lens driving section 430, an image sensor 440, an image sensor driving section 450, and an image data generator 460.

The lens section 420 is provided on a front surface of the housing 210. The lens section 420 includes an imaging lens 422 that causes a subject image to be formed on a light-receiving surface of the image sensor 440, a stop 424 that adjusts the intensity of light passing through the imaging lens 422, and a shutter 426 that adjusts an exposure time. The imaging lens 422 includes a focus lens, and adjusts a focus by moving back and forth the focus lens along an optical axis.

The lens driving section 430 drives the lens section 420 according to a command from the controller 310. That is, the lens driving section 430 moves back and forth the focus lens along the optical axis. Further, the lens driving section 430 expands or contracts the diameter of the stop 424. In addition, the lens driving section 430 opens or closes the shutter 426.

The image sensor 440 is configured of a two-dimensional solid image pickup element such as a charge coupled device (CCD) image sensor or a complementary metal oxide semiconductor (CMOS) image sensor.

The image sensor driving section 450 drives the image sensor 440 according to a command from the controller 310.

The image data generator 460 performs a predetermined process with respect to a signal output from the image sensor 440 to generate digital image data.

The operating section 280 includes a shutter button that is imaging instruction means. Further, the display section 290 is provided with a main display that displays a live view image and a captured image. The main display is provided on a rear surface of the housing 210.

<Operation>

In order to prevent exposure of the instant film 10, the instant film pack 1 is loaded in the loading chamber 220 in a state where the film cover 60 is mounted. In the digital camera 400, the instant film pack 1 is used in a state where the film cover 60 is not removed. Accordingly, even though the instant film pack 1 is loaded in the loading chamber 220, the discharge process of the film cover 60 is not performed.

In a case where an imaging instruction is given through the operating section 280, an image is captured by the image sensor 440. A signal output from the image sensor 440 is inserted into the image data generator 460, and a predetermined signal processing is performed. Thus, image data of the captured image is generated. Then, the generated image data is provided to the print data generator 260, and predetermined signal processing is performed. Thus, print data of the captured image is generated.

In a case where the generation of the print data is completed, the discharge section 230 is driven, and one instant film 10 is discharged from the case 20. The discharged instant film 10 is the instant film 10 disposed at the topmost position in the case in the laminating direction. The discharge section 230 moves the claw 232 in the discharge direction, and causes the claw 232 to enter the case, to thereby discharge the instant film 10. The claw 232 enters the case through the claw opening portion 32 of the case 20, and presses out the instant film 10 in the case through the discharge port 28. Here, the claw 232 is moved within a range of the notched portion 62 of the film cover 60 to press out the instant film 10. Thus, in a state where the film cover 60 is mounted, only the instant film can be discharged.

In synchronization with the discharge of the instant film 10 using the discharge section 230, the transport section 240 is driven. The transport section 240 receives the instant film 10 discharged through the discharge port 28 of the case 20, and transports the instant film 10 at a predetermined speed. In synchronization with the transport, the exposure head 272 is driven, and the image is recorded on the instant film 10.

The instant film 10 on which the image is recorded is spread by a development processing liquid by the spreading roller pair 246 to be developed in a process of being transported by the transport section 240. Further, the developed instant film 10 is discharged from the housing 210.

As described above, according to the digital camera 400 of this embodiment, it is possible to record an image on the instant film 10 without discharging the film cover 60. Thus, it is possible to simplify a configuration of the transport section 240, and to record a high-quality image with a compact configuration.

The image data of the captured image is stored in the storage section 300 as necessary.

<Analog-Type Instant Camera>

An analog-type instant camera is an example of an image recording device, and is a camera of a type in which an image of a subject is formed on an exposure surface of an instant film using a lens to record the image of the subject on the instant film.

<Configuration>

Figure 30:
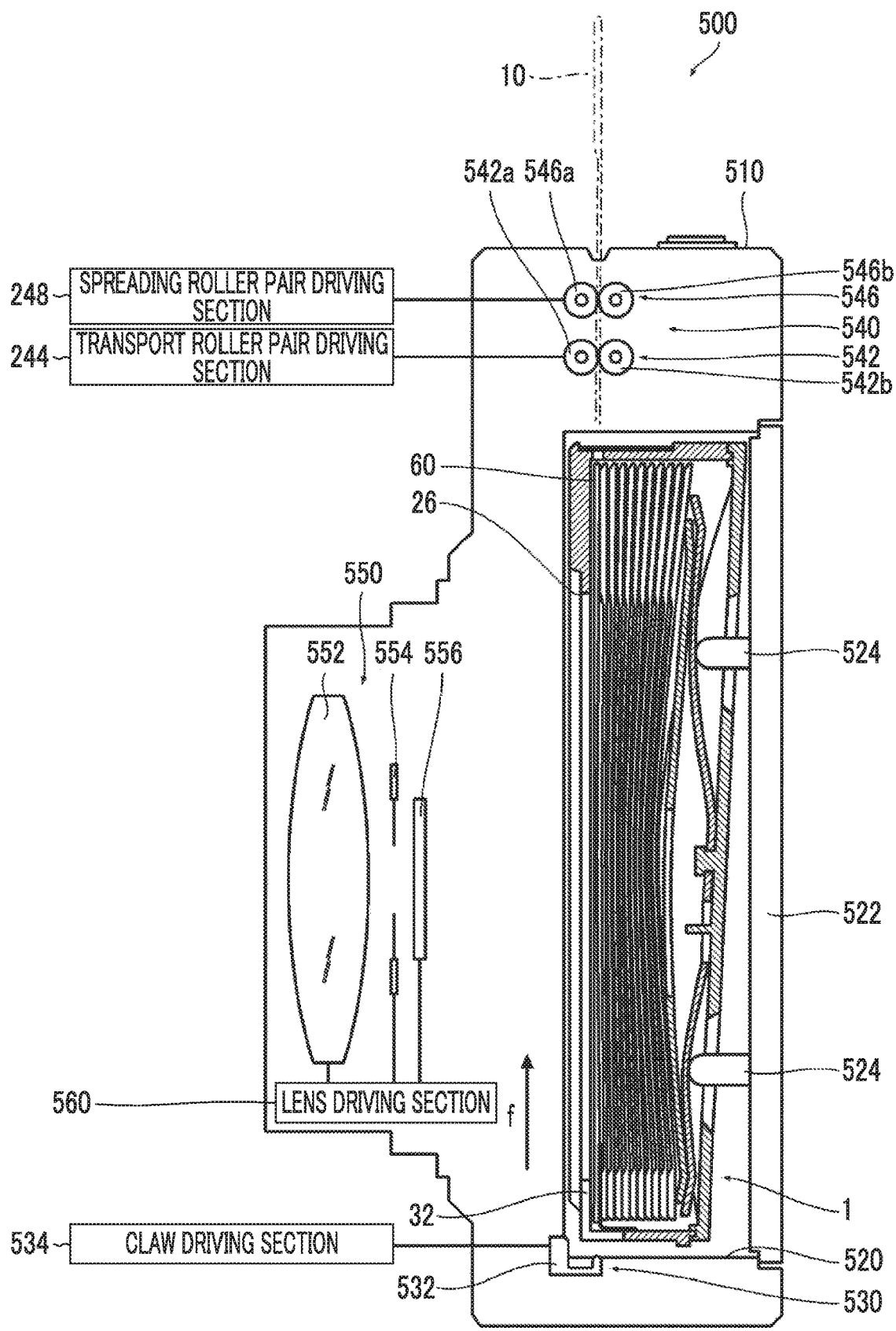
FIG. 30 is a diagram showing a schematic configuration of an analog-type instant camera.
Figure 31:
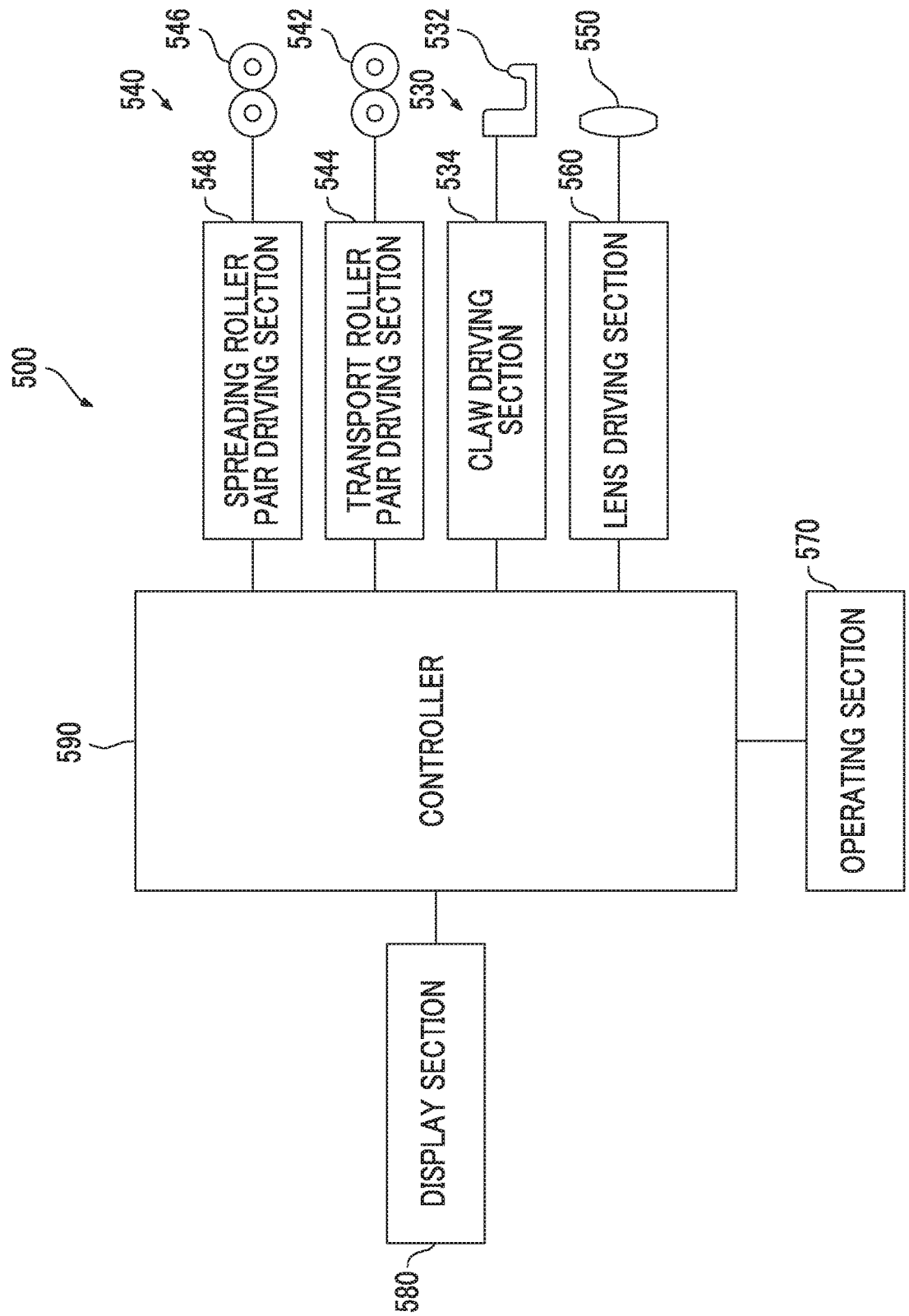
FIG. 31 is a block diagram showing a control system of the analog-type instant camera.

FIG. 30 is a diagram showing a schematic configuration of the analog-type instant camera. In FIG. 30, the direction indicated using the arrow f is the discharge direction of the instant film 10. FIG. 31 is a block diagram showing a control system of the analog-type instant camera.

An analog-type instant camera 500 includes a housing 510 in which a light shielding characteristic is secured, a loading chamber 520 in which the instant film pack 1 is loaded, a discharge section 530 that discharges the instant film 10 from the instant film pack 1 loaded in the loading chamber 520, a transport section 540 that transports the instant film 10 discharged by the discharge section 530, a lens section 550, a lens driving section 560, an operating section 570, a display section 580, and a controller 590.

The loading chamber 520 is provided in the housing 510 as a concave portion capable of accommodating the instant film pack 1. The instant film pack 1 is loaded in the loading chamber 520 with the exposure opening portion 26 being directed toward a bottom surface of the loading chamber 520. In a case where the instant film pack 1 is loaded in the loading chamber 520, the instant film pack 1 is positioned at a predetermined position.

The loading chamber 520 has a loading chamber cover 522, and is opened or closed by the loading chamber cover 522. The loading chamber cover 522 is provided with uplifting members 524. In a case where the instant film pack 1 is loaded in the loading chamber 520 and the loading chamber cover 522 is closed, the uplifting members 524 are inserted into the uplifting member inserting portions 36 of the instant film pack 1. Thus, the instant film 10 in the case is pressed by the uplifting members 524 to be pressed against an inner surface of the case 20.

The discharge section 530 discharges the instant film 10 from the instant film pack 1 loaded in the loading chamber 520 one by one. A configuration of the discharge section 530 is the same as that of the above-described discharge mechanism 100 of the instant film 10. That is, the discharge section 530 includes a claw 532, and a claw driving section 534 that moves the claw 532 along the discharge direction of the instant film 10. The discharge section 530 discharges the instant film 10 from the case 20 by inserting the claw 532 through the claw opening portion 32 with respect to the instant film pack 1 loaded in the loading chamber 520 and pressing out the instant film 10 in the case using the claw 532. Further, the claw 532 is inserted into the instant film pack 1 loaded in the loading chamber 520 through the claw opening portion 32, and the film cover 60 in the case is pressed out by the claw 532, and thus, the film cover 60 is discharged from the case 20.

Here, in a case where the film cover 60 is discharged, the discharge section 530 moves the claw 532 within a range exceeding the notched portion 62. Thus, the film cover 60 can be discharged by the claw 532.

In a case where the instant film 10 is discharged, the claw 532 is moved in a stroke shorter than that in the case of the film cover 60. That is, it is possible to move the claw 532 within a range where the instant film 10 can be delivered to the transport section 540.

The transport section 540 transports the instant film 10 discharged from the case 20 by the discharge section 530 and the film cover 60. With respect to the instant film 10, a development processing liquid is spread in the transport process. The transport section 540 includes a transport roller pair 542, a transport roller pair driving section 544 that drives the transport roller pair 542 to be rotatable, a spreading roller pair 546, and a spreading roller pair driving section 548 that drives the spreading roller pair 546 to be rotatable.

The transport roller pair 542 includes a transport driving roller 542a and a transport driven roller 542b. The transport roller pair 542 is configured so that the instant film 10 is sandwiched by the transport driving roller 542a and the transport driven roller 542b. The transport driving roller 542a is configured to come into contact with only both sides of the instant film 10.

The transport roller pair driving section 544 includes a motor, and a rotation transmission mechanism that transmits rotation of the motor to the transport driving roller 542a.

The spreading roller pair 546 is disposed on a downstream side of the transport roller pair 542 in a transport direction of the instant film 10. The spreading roller pair 546 includes a spreading driving roller 546a and a spreading driven roller 546b. The spreading roller pair 546 transports the instant film 10 with the instant film 10 being sandwiched by the spreading driving roller 546a and the spreading driven roller 546b. Further, the spreading roller pair 546 squeezes out the pod portion 14 of the instant film 10 in the transport process to spread the development processing liquid.

The spreading roller pair driving section 548 includes a motor, and a rotation transmission mechanism that transmits rotation of the motor to the spreading driving roller 546a.

The lens section 550 is provided on a front surface of the housing 510. The lens section 550 includes an imaging lens 552 that causes a subject image to be formed on the instant film 10 of the instant film pack 1 loaded in the loading chamber 520, a stop 554 that adjusts the intensity of light passing through the imaging lens 552, and a shutter 556 that adjusts an exposure time. The imaging lens 552 includes a focus lens, and adjusts a focus by moving back and forth the focus lens along an optical axis.

The lens driving section 560 drives the lens section 550 according to a command from the controller 590. That is, the lens driving section 560 moves back and forth the focus lens along the optical axis. Further, the lens driving section 560 expands or contracts the diameter of the stop 554. In addition, the lens driving section 560 opens or closes the shutter 556.

The operating section 570 is provided to perform various operations with respect to the analog-type instant camera 500. The operating section 570 includes operating members such as a shutter button or an operating button, and outputs information based on operations of the operating members to the controller 590.

The display section 580 displays a setting of the analog-type instant camera 500, the number of captured images, an operating status, a warning, or the like. The display section 580 includes a display configured of a liquid crystal display (LCD) or the like, and a drive circuit thereof, for example.

The controller 590 generally controls the entire operations of the analog-type instant camera 500. The controller 590 is configured of a microcomputer, for example.

<Operation>

In order to prevent exposure of the instant film 10, the instant film pack 1 is loaded in the loading chamber 520 in a state where the film cover 60 is mounted.

In the analog-type instant camera 500, imaging is performed by irradiating the instant film 10 in the case with light from the imaging lens 552. Accordingly, in the analog-type instant camera 500, in a case where the instant film pack 1 is loaded in the loading chamber 520, the discharge process of the film cover 60 is performed. The discharge of the film cover 60 is performed using the claw 532 as follows.

In a case where the instant film pack 1 is loaded in the loading chamber 520, and then, the loading chamber cover 522 is closed, the claw 532 starts to move along the discharge direction. The claw 532 enters the case through the claw opening portion 32. The claw 532 that enters the case is moved within a range that exceeds the range of the notched portion 62 of the film cover 60. Thus, the film cover 60 is pressed out by the claw 532, and is discharged through the discharge port 28. The claw 532 is moved up to a predetermined position, and then, returns to an original position.

In synchronization with the movement of the claw 532, the transport section 540 is driven. The transport section 540 receives the film cover 60 discharged through the discharge port 28 of the case 20, and discharges the film cover 60 to the outside of the device.

Hence, the discharge process of the film cover 60 is completed. Then, imaging is possible. The imaging is performed by pressing the shutter button.

In a case where the shutter button is pressed, the instant film 10 disposed at the topmost position in the case is exposed. After the exposure, the discharge process of the exposed instant film pack 1 is performed. The discharge of the instant film 10 is performed using the claw 532 as follows.

In a case where exposure is completed, the claw 532 starts to move along the discharge direction. The claw 532 enters the case through the claw opening portion 32. The exposed instant film 10 is pressed out by the claw 532 that enters the case to be discharged through the discharge port 28. The claw 532 is moved up to a predetermined position, and then, returns to the original position. Here, the amount of movement of the claw 532 is set to be shorter than the amount of movement in the discharge of the film cover.

In synchronization with the movement of the claw 532, the transport section 540 is driven. The transport section 540 receives the film cover 60 discharged through the discharge port 28 of the case 20, and discharges the film cover 60 to the outside of the device. The instant film 10 is spread by a development processing liquid by the spreading roller pair 546 to be developed in a process of being transported by the transport section 540.

As described above, according to the analog-type instant camera 500 of this embodiment, the film cover 60 is removed, and then, the instant film pack 1 may be used.

In a case where the instant film pack 1α of the second embodiment is used, the following claw is used as the claw 532 of the discharge section 530. That is, a claw having a thickness greater than the width of the notched portion 62 and smaller than the width of the claw opening portion 32 is used. In this case, it is not necessary that the amount of movement of the claw in the discharge of the film cover 60 and the amount of movement of the claw in the discharge of the instant film 10 are different from each other.

<Printer in which Film Cover is Removed>
<Configuration>

Figure 32:
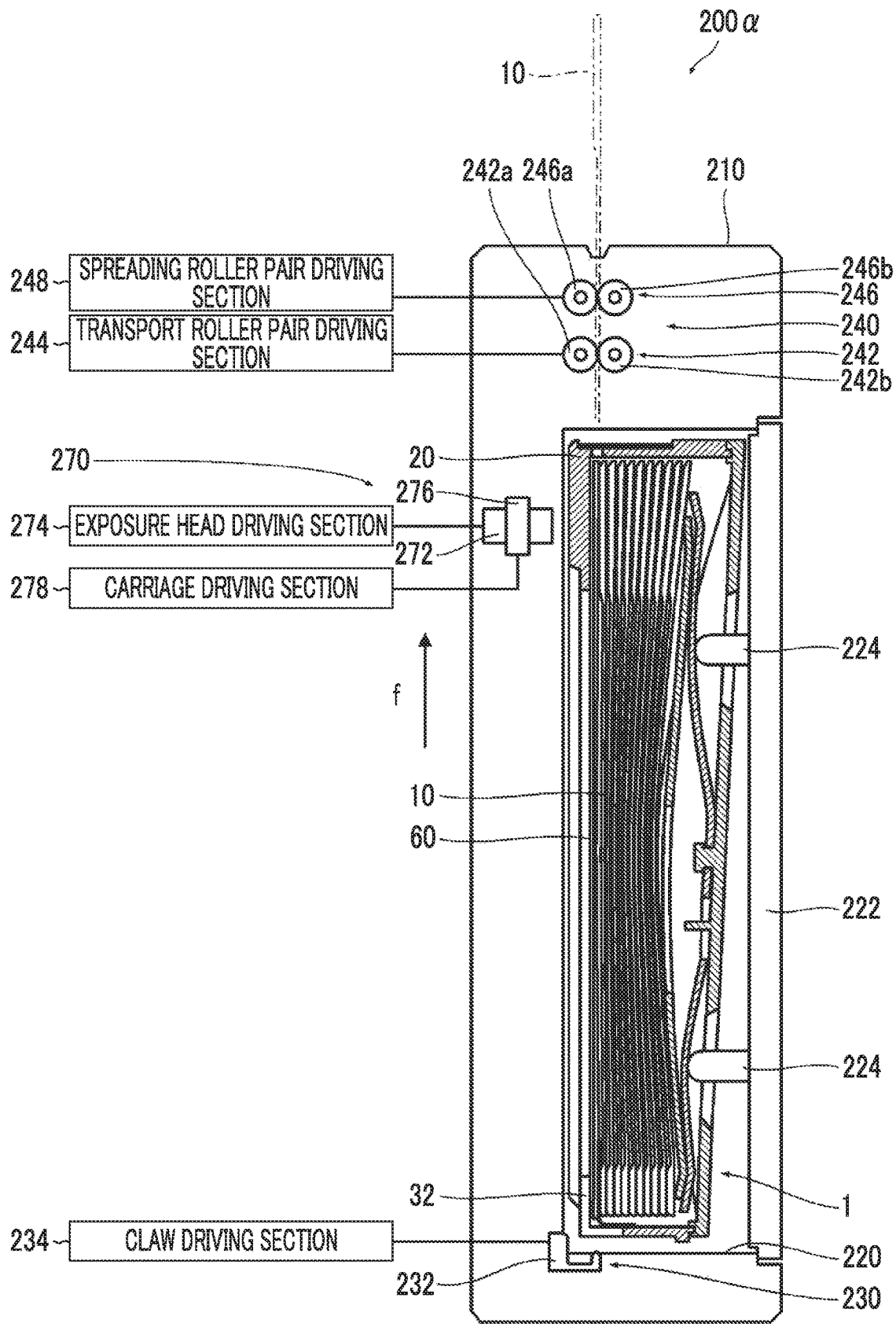
FIG. 32 is a diagram showing a schematic configuration of a printer in which a film cover is removed in use.

FIG. 32 is a diagram showing a schematic configuration of a printer in which a film cover is removed. In FIG. 32, the direction indicated using the arrow f is the discharge direction of the instant film 10. FIG. 33 is a block diagram showing a control system of the printer.

A printer 200α of this example moves an exposure head 272 to record an image on the instant film 10 in the case. Accordingly, it is necessary to remove the film cover 60 in use.

Except that the exposure head 272 is movably provided and the film cover 60 is removed to use the instant film pack 1, the configuration of the printer 200α is the same as the above-described configuration of the printer 200. Accordingly, only different points will be described hereinafter.

The exposure head 272 is movably mounted in a carriage 276. The carriage 276 is supported to be movable along the discharge direction of the instant film 10.

A carriage driving section 278 that moves the carriage 276 is provided in the printer 200a. The carriage driving section 278 moves the carriage 276 along the discharge direction of the instant film 10. The carriage driving section 278 includes a motor, and a power transmission mechanism that converts rotation of the motor into linear motion and transmits the linear motion to the carriage 276.

<Operation>

In order to prevent exposure of the instant film 10, the instant film pack 1 is loaded in the loading chamber 220 in a state where the film cover 60 is mounted. In a case where the instant film pack 1 is loaded in the loading chamber 220, the discharge process of the film cover 60 is performed. The process of discharging the film cover 60 is performed using the claw 232 as follows.

In a case where the instant film pack 1 is loaded in the loading chamber 220 and the loading chamber cover 222 is closed, the claw 232 starts to move along the discharge direction. The claw 232 enters the case through the claw opening portion 32. The claw 232 that enters the case is moved within a range that exceeds the range of the notched portion 62 of the film cover 60. Thus, the film cover 60 is pressed out by the claw 232, and is discharged through the discharge port 28. The claw 232 is moved up to a predetermined position, and then, returns to the original position.

In synchronization with the movement of the claw 232, the transport section 240 is driven. The transport section 240 receives the film cover 60 discharged through the discharge port 28 of the case 20, and discharges the film cover 60 to the outside of the device.

Hence, the discharge process of the film cover 60 is completed. Then, printing is possible.

In a case where image data of an image to be recorded on the instant film 10 is acquired by the image data acquisition section 250 and a printing instruction is given through the operating section 280, a printing process is started.

First, print data of an image to be printed is generated by the print data generator 260.

After the print data is generated, the carriage driving section 278 is driven, and then, the carriage 276 starts to move at a predetermined speed. In synchronization with the movement of the carriage 276, the exposure head 272 is driven, and an image is recorded on the instant film 10.

In a case where the recording of the image is completed, the carriage 276 returns to the original position. At the same time, the discharge section 230 is driven, and then, the instant film 10 on which the image is recorded is discharged from the case 20. The discharge section 230 moves the claw 232 along the discharge direction, and causes the claw 232 to enter the case, to thereby discharge the instant film 10.

The transport section 240 is driven in synchronization with the discharge of the instant film 10 in the discharge section 230. The transport section 240 receives the instant film 10 discharged through the discharge port 28 of the case 20, and discharges the instant film 10. The instant film 10 on which the image is recorded is spread by a development processing liquid by the spreading roller pair 246 to be developed in a process of being transported by the transport section 240. Further, the developed instant film 10 is discharged from the housing 210.

As described above, according to the printer 200 of this embodiment, it is possible to use the instant film pack 1 in a state where the film cover 60 is removed.

In a case where the instant film pack 1α of the second embodiment is used, a claw having a thickness greater than the width of the notched portion 62 and smaller than the width of the claw opening portion 32 is used. In this case, it is not necessary that the amount of movement of the claw varies in discharge of the film cover 60 and in discharge of the instant film 10.

Further, the printer may be provided with a digital camera section to be configured as a digital camera with a printer. Further, printer may be provided with a scanner function to be configured as a scanner with a printer.

Other Embodiments

In the above-described embodiments, the claw opening portion is disposed in the vicinity of the end portion of the case in the width direction (the direction perpendicular to the discharge direction of the instant film), but a position where the claw opening portion is disposed is not limited thereto. For example, the position may be the center of the case in the width direction.

Further, the claw opening portion may be provided at a plurality of locations of the case. In this case, the notched portion may be provided at a plurality of locations of the film cover to correspond to the claw opening portions.

In addition, in the above-described embodiments, a structure in which the instant film and the film cover are discharged using one claw is used, but a structure in which the instant film and the film cover are discharged using a plurality of claws may be used.

Further, in the above-described embodiments, a structure in which the instant film and the film cover are pressed out using a claw is used, but a structure in which the instant film and the film cover are pulled out using a claw may be used.

Furthermore, in the above-described embodiments, a plurality of instant films are accommodated in the case, but a structure in which only one instant film is accommodated in the case may be used.

EXPLANATION OF REFERENCES

1: instant film pack
1α: instant film pack
10: instant film
10a: exposure surface
10b: observation surface
12: exposure portion
14: pod portion
14a: development processing liquid pod
16: trap portion
16a: absorption material
18: observation portion
20: case
22: case body
22a: front surface portion
22b: upper surface portion
22c: bottom portion
24: case cover
26: exposure opening portion
28: discharge port
30: case flap member
32: claw opening portion
32a: inlet
32b: passage portion
34: film cover mounting portion
34a: rail
36: uplifting member inserting portion
38: film support portion
40: light shielding sheet mounting portion
50: light shielding sheet
52: first light shielding sheet
52a: cut portion
52b: fixing portion
54: second light shielding sheet
60: film cover
62: notched portion
64: film cover skirt member
64a: skirt portion
100: discharge mechanism
110: claw
110a: insertion portion
110aα: insertion portion
110aβ: insertion portion
110b: concave portion
110α: first claw
110β: second claw
112: claw driving section
200: printer
200α: printer
210: housing
220: loading chamber
222: loading chamber cover
224: uplifting member
230: discharge section
232: claw 234: claw driving section
240: transport section
242: transport roller pair
242a: transport driving roller
242b: transport driven roller
244: transport roller pair driving section
246: spreading roller pair
246a: spreading driving roller
246b: spreading driven roller
248: spreading roller pair driving section
250: image data acquisition section
260: print data generator
270: recording section
272: exposure head
274: exposure head driving section
276: carriage
278: carriage driving section
280: operating section
290: display section
292: main display
300: storage section
310: controller
400: digital camera
420: lens section
422: imaging lens
424: stop
426: shutter
430: lens driving section
440: image sensor
450: image sensor driving section
460: image data generator
500: instant camera
510: housing
520: loading chamber
522: loading chamber cover
524: uplifting member
530: discharge section
532: claw
534: claw driving section
540: transport section
542: transport roller pair
542a: transport driving roller
542b: transport driven roller
544: transport roller pair driving section
546: spreading roller pair
546a: spreading driving roller
546b: spreading driven roller
548: spreading roller pair driving section
550: lens section
552: imaging lens
554: stop
556: shutter
560: lens driving section
570: operating section
580: display section
590: controller
F: feeding direction of instant film
f: discharge direction of instant film
x: range of notched portion

What is claimed is:

1. An instant film pack comprising:
an instant film;
a case that accommodates the instant film, and includes an exposure opening portion for exposing an exposure region of the instant film, a discharge port for discharging the instant film, and a claw opening portion for inserting a claw; and
a film cover that is mounted in the case, is dark enough to shield the instant film from being exposed by the light from the exposure opening portion, and includes a notched portion continuous to the claw opening portion,
wherein the notched portion is configured such that only the instant film is discharged in a case where the claw moves within a range of the notched portion, and the film cover remains in the case.

2. The instant film pack according to claim 1,
wherein the notched portion has a width narrower than that of the claw opening portion.

3. The instant film pack according to claim 1, further comprising:
a light shielding member that shields light from the claw opening portion and the notched portion.

4. The instant film pack according to claim 2, further comprising:
a light shielding member that shields light from the claw opening portion and the notched portion.

5. The instant film pack according to claim 3,
wherein the light shielding member is configured to be capable of being cut, and is cut by the claw as the claw is inserted into the claw opening portion and the notched portion.

6. The instant film pack according to claim 4,
wherein the light shielding member is configured to be capable of being cut, and is cut by the claw as the claw is inserted into the claw opening portion and the notched portion.

7. The instant film pack according to claim 3,
wherein the light shielding member is configured to be deformable, and is deformed by being pressed by the claw as the claw is inserted into the claw opening portion and the notched portion.

8. The instant film pack according to claim 4,
wherein the light shielding member is configured to be deformable, and is deformed by being pressed by the claw as the claw is inserted into the claw opening portion and the notched portion.

9. The instant film pack according to claim 3,
wherein the light shielding member is configured to be movable, and is moved by being pressed by the claw as the claw is inserted into the claw opening portion and the notched portion.

10. The instant film pack according to claim 4,
wherein the light shielding member is configured to be movable, and is moved by being pressed by the claw as the claw is inserted into the claw opening portion and the notched portion.

11. The instant film pack according to claim 1,
wherein the film cover is disposed in the case, and is discharged through the discharge port.

12. The instant film pack according to claim 2,
wherein the film cover is disposed in the case, and is discharged through the discharge port.

13. The instant film pack according to claim 3,
wherein the film cover is disposed in the case, and is discharged through the discharge port.

14. The instant film pack according to claim 7,
wherein the film cover is disposed in the case, and is discharged through the discharge port.

15. The instant film pack according to claim 9,
wherein the film cover is disposed in the case, and is discharged through the discharge port.

16. The instant film pack according to claim 11,
wherein the film cover is disposed to overlap the instant film.

17. An image recording device comprising:
- a loading chamber in which the instant film pack according to claim 1 is loaded;
- a discharge section that discharges only the instant film from the instant film pack loaded in the loading chamber using the claw, the discharge section discharging the instant film by inserting the claw into the case through the claw opening portion and moving the claw within a range of the notched portion;
- a transport section that transports the instant film discharged by the discharge section;
- an image data acquisition section that acquires image data; and
- an exposure head that records an image represented by the image data on the instant film transported by the transport section.

18. The image recording device according to claim 17, further comprising:
- a digital camera section that captures an image using an image sensor,
- wherein the image data acquisition section acquires image data generated by the digital camera section.

19. An image recording device comprising:
- a loading chamber in which the instant film pack according to claim 1 is loaded;
- a discharge section that discharges the instant film and the film cover from the instant film pack loaded in the loading chamber using the claw, and in a case where the film cover is discharged, the discharge section discharges the film cover by inserting the claw into the case through the claw opening portion and moving the claw within a range that exceeds a range of the notched portion;
- a lens that forms a subject image on the instant film of the instant film pack loaded in the loading chamber; and
- a transport section that transports the instant film and the film cover discharged by the discharge section.

20. An image recording device comprising:
- a loading chamber in which the instant film pack according to claim 2 is loaded;
- a discharge section that discharges the instant film and the film cover from the instant film pack loaded in the loading chamber using the claw having a thickness greater than the width of the notched portion;
- a lens that forms a subject image on the instant film of the instant film pack loaded in the loading chamber; and
- a transport section that transports the instant film and the film cover discharged by the discharge section.

* * * * *